United States Patent
Ishii et al.

(10) Patent No.: US 7,971,675 B2
(45) Date of Patent: Jul. 5, 2011

(54) HYDRAULIC TRANSAXLE AND VEHICLE COMPRISING IT

(75) Inventors: Norihiro Ishii, Hyogo (JP); Koji Irikura, Hyogo (JP); Ryota Ohashi, Hyogo (JP); Shigenori Sakikawa, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 482 days.

(21) Appl. No.: 12/181,790

(22) Filed: Jul. 29, 2008

(65) Prior Publication Data

US 2008/0296080 A1 Dec. 4, 2008

Related U.S. Application Data

(63) Continuation of application No. 10/990,976, filed on Nov. 18, 2004, now Pat. No. 7,419,025.

(30) Foreign Application Priority Data

Nov. 20, 2003 (JP) .................................. 2003-391505

(51) Int. Cl.
*B60K 7/00* (2006.01)
*B60K 17/356* (2006.01)
(52) U.S. Cl. ......................... 180/242; 180/6.48; 180/308
(58) Field of Classification Search .................. 180/6.48, 180/242, 307, 308, 403; 60/487, 488
See application file for complete search history.

(56) References Cited

U.S. PATENT DOCUMENTS

| 2,996,135 | A | 8/1961 | Grabow |
| 5,590,737 | A | 1/1997 | Azuma et al. |
| 6,877,573 | B2 | 4/2005 | Hasegawa |
| 2002/0179340 | A1* | 12/2002 | Jolliff et al. .................. 180/6.48 |
| 2004/0069553 | A1* | 4/2004 | Ohashi et al. ................. 180/235 |

FOREIGN PATENT DOCUMENTS

| DE | 195 39 043 | 4/1997 |
| GB | 1 354 560 A | 6/1974 |
| JP | 55132325 | 10/1980 |
| JP | 64004514 | 1/1989 |
| JP | 2002-22007 | 1/2002 |
| JP | 2004-210215 | 7/2004 |
| WO | WO 01/60649 | 8/2001 |

OTHER PUBLICATIONS

European Search Report for European Application No. EP 04 02 7191, European Patent Office, Netherlands, completed on Mar. 4, 2005.
Patent Abstracts of Japan, English language abstract for document FP4, JP 553132325.
Patent Abstracts of Japan, English language abstract for document FP5, JP 64004514.

* cited by examiner

*Primary Examiner* — Paul N Dickson
*Assistant Examiner* — Marc A Scharich
(74) *Attorney, Agent, or Firm* — Sterne, Kessler, Goldstein & Fox P.L.L.C.

(57) ABSTRACT

A hydraulic transaxle comprises a transaxle casing for supporting left and right axles, a pair of hydraulic motors disposed in the transaxle casing so as to drive the respective left and right axles, hydraulic ports provided in the transaxle casing so as to fluidly connect the pair of hydraulic motors in parallel to a common hydraulic pump, and a system for restricting or canceling differential rotation of the pair of hydraulic motors.

4 Claims, 20 Drawing Sheets

Fig. 20

Condition Patterns for Switching on of Actuator 101

| Detected Target | Sensor | Pattern A | Pattern B | Pattern C | Pattern D | Pattern E |
|---|---|---|---|---|---|---|
| 105, 106 | 100f, 100g | D | U | U | U | U |
| 103 | 100b | Any Position | Lift up | Lift up | Lift up | Lift up |
| 9R, 9L | 100d, 100e | Any S.D. | Large S.D. | Large S.D. | Large S.D. | Large S.D. |
| 102 | 100a | Any Position | D | D | U | U |
| 104 | 100c | Any Angle | Large Angle | Small Angle | Large Angle | Small Angle |

※ "D" means "Depressed", and "U" means "Undepressed".
※ "S.D." means "Speed Difference".

HYDRAULIC TRANSAXLE AND VEHICLE COMPRISING IT

CROSS-REFERENCE TO RELATED APPLICATIONS

This application is a continuation of U.S. application Ser. No. 10/990,976, filed Nov. 18, 2004, the entire disclosure of which is incorporated herein by reference.

BACKGROUND OF THE INVENTION

1. Field of the Invention

The invention relates to a hydraulic transaxle incorporating a pair of hydraulic motors for respective left and right wheels. The invention also relates to a four-wheel driving vehicle equipped with the hydraulic transaxle incorporating the pair of hydraulic motors and another hydraulic transaxle incorporating a hydraulic motor for driving corresponding left and right wheels, wherein all the hydraulic motors of the two transaxles are driven by a common hydraulic pump.

2. Related Art

Conventionally, there is a conventional well-known transaxle such as disclosed in Japanese Laid Open Gazette No. 2004-210215. The transaxle incorporates a pair of hydraulic motors for driving respective axles (drive wheels), and the hydraulic motors are fluidly connected in parallel to a hydraulic pump out of the transaxle, whereby the wheels driven by the respective hydraulic motors can rotate differentially.

The transaxle incorporating the pair of hydraulic motors instead of a conventional mechanical differential gearing assembly is compact vertically and widthwise so that the vertical position of the transaxle can be optionally lowered so as to stabilize a vehicle or raised so as to ensure a large ground clearance.

The problem of the pair of hydraulic motors fluidly connected in parallel to the hydraulic pump is that, when a vehicle is stuck because one of the wheels driven by the pair of hydraulic motors is caught in a ditch or mud and intends to run idle, fluid from the hydraulic pump is concentrated to the hydraulic motor for driving the idling wheel and the other hydraulic motor is insufficiently supplied with fluid to drive the corresponding wheel. A conventional differential locking system for a conventional mechanical differential gearing assembly, such as disclosed in Japanese Laid Open Gazette No. 2002-22007, does not solve the above problem for the hydraulic transaxle.

SUMMARY OF THE INVENTION

An object of the present invention is to provide a hydraulic transaxle incorporating a pair of hydraulic motors for driving respective axles, which can solve the above problem.

To achieve the object, according to a first aspect of the present invention, a transaxle comprises a transaxle casing for supporting left and right axles, a pair of hydraulic motors disposed in the transaxle casing so as to drive the respective left and right axles, hydraulic ports provided in the transaxle casing so as to fluidly connect the pair of hydraulic motors in parallel to a common hydraulic pump, and a system for restricting or canceling differential rotation of the pair of hydraulic motors. The system can cancel or restrict differential rotation of the hydraulic motors so as to facilitate a stuck vehicle to easily escape from a ditch or mud.

Preferably, the system includes means for mechanically connecting motor shafts of the hydraulic motors to each other.

Alternatively, preferably, the system includes means for mechanically applying frictional force onto motor shafts of the hydraulic motors.

Alternatively, preferably, the system includes a hydraulic circuit for fluidly connecting the hydraulic motors in tandem to the common hydraulic pump. Further preferably, the hydraulic motors include displacement control means, which reduces displacements of the hydraulic motors when the hydraulic motors are fluidly connected in tandem to the common hydraulic pump by the hydraulic circuit of the system. Alternatively, further preferably, the hydraulic motors include displacement control means, which increases displacements of the hydraulic motors when the hydraulic motors are fluidly connected in tandem to the common hydraulic pump by the hydraulic circuit of the system.

Alternatively, preferably, the system includes a first hydraulic circuit for distributing unrestricted fluid to the hydraulic motors fluidly connected in parallel to the common hydraulic pump, and a second hydraulic circuit for distributing restricted fluid to the hydraulic motors fluidly connected in tandem to the common hydraulic pump. One of the first and second hydraulic circuits is selected. Further preferably, the system includes a hydraulic pilot pressure valve for selecting one of the first and second hydraulic circuits. The hydraulic pilot pressure is caused by hydraulic pressure difference between the hydraulic motors.

Preferably, the transaxle comprises a controller for deciding whether the system should act or not depending upon whether a predetermined condition occurs or not. Further preferably, the transaxle comprises detection means for detecting output torques of the respective hydraulic motors. The controller decides whether the system should act or not depending upon whether output torque of one of the hydraulic motors detected by the detection means exceeds a predetermined value or not. Further preferably, the system optionally acts in addition to the action thereof decided by the controller. Further preferably, the predetermined value can be adjusted.

According to a second aspect of the invention, a vehicle equipped with the transaxle is further equipped with another transaxle incorporating another hydraulic motor for driving left and right other axles, and with a common hydraulic pump for supplying fluid to all the hydraulic motors of the two transaxles.

These, other and further objects, features and advantages will appear more fully from the following description with reference to accompanying drawings.

BRIEF DESCRIPTION OF THE DRAWINGS

FIG. 12 is a structural and hydraulic circuit diagram of a four-wheel driving vehicle equipped with steering transaxle 1E and unsteering transaxle 20D.

FIG. 20 is a table showing condition patterns for switching on of a representative electrically controlled actuator 101 for differential locking or restriction by using the electric control system of FIG. 19.

DETAILED DESCRIPTION OF THE INVENTION

Figure 1:
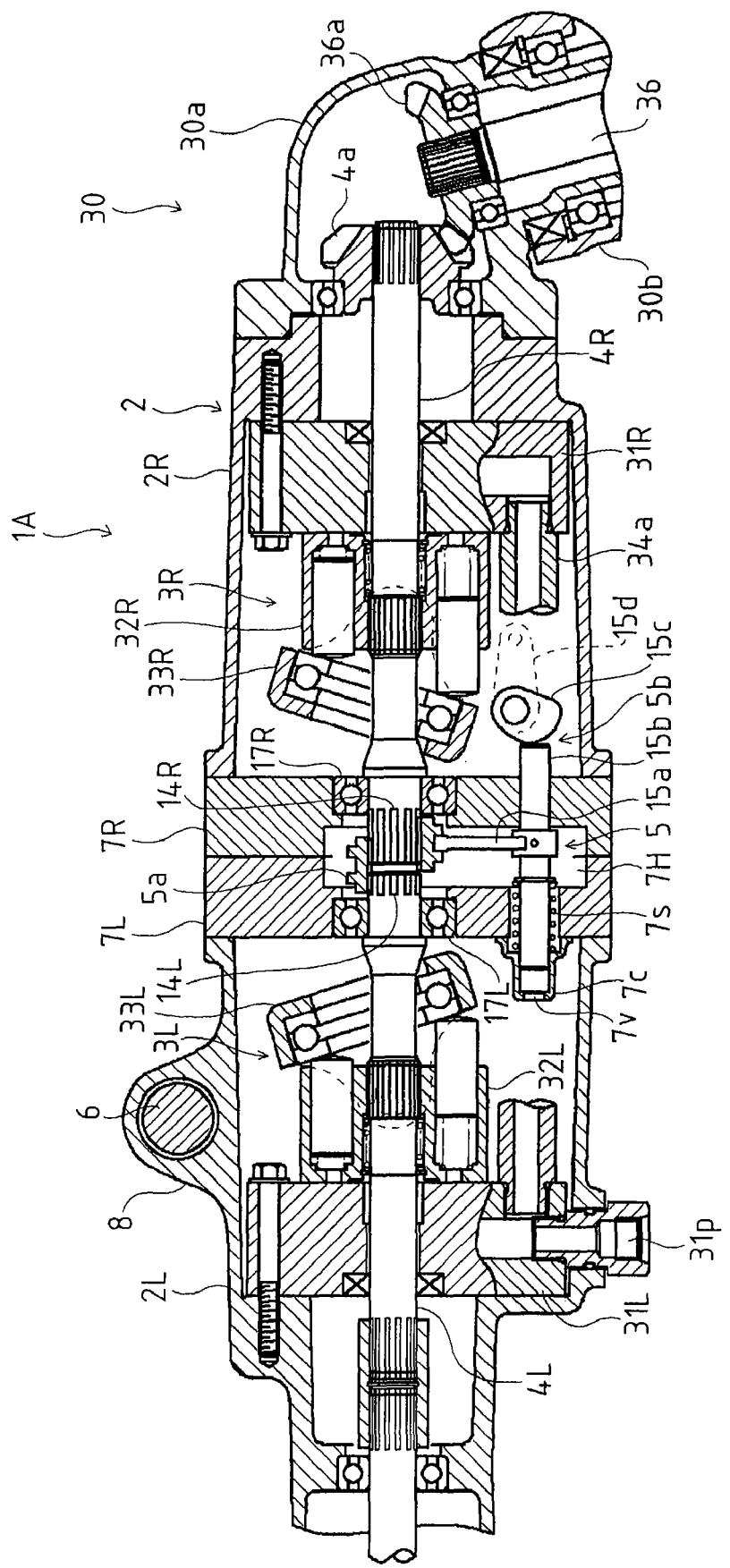
FIG. 1 is a sectional rear view of a steering transaxle 1A incorporating a pair of hydraulic motors 3L and 3R provide with a mechanical differential locking system 5.

Common structures of steering transaxles 1A, 1B, 1C, 1D, 1E, 1F, 1G and 1H will be described with reference to representing steering transaxle 1A shown in FIGS. 1 to 3. In later description of each of steering transaxles 1B to 1H, portions and members designated by the same reference numerals as those used for description of steering transaxle 1A are identical or have the same functions, whereby description of the portions and members will be omitted.

Steering transaxle 1A includes a transaxle casing 2 incorporating left and right variable displacement hydraulic motors 3L and 3R. Steering transaxle 1A shown in FIG. 1 further includes left and right symmetrical wheel support units 30 (left wheel support unit 30 is omitted in FIG. 1). FIG. 2 illustrates representing right wheel support unit 30. Left and right symmetrical wheel support units 30 represented in FIG. 2 are also used for later-discussed various steering transaxles 1B to 1H.

Left and right wheel support units 30 support respective axles 35 to be drivingly connected to respective hydraulic motors 3L and 3R. Left and right wheels 9L and 9R to be driven by respective hydraulic motors 3L and 3R are attached to outer ends of respective axles 35. Left and right wheels support units 30 are mounted onto left and right ends of transaxle casing 2 and operatively connected to a steering operation device (such as a steering wheel 103 shown in FIG. 19), whereby wheels 9L and 9R serve as steerable wheels.

Steering transaxle 1A to 1H are provided with various differential locking or restriction systems each of which cancels or restricts the differential rotation of motors 3L and 3R. Steering transaxles 1A to 1H, excluding steering transaxle 1C, are provided with various switching systems, each of which selectively establishes either a state where hydraulic motors 3L and 3R can be differentially rotated or a state where the differential rotation of hydraulic motors 3L and 3R is canceled or restricted. Steering transaxle 1A shown in FIGS. 1 and 3 is provided with a mechanical differential locking system 5 interposed between hydraulic motors 3L and 3R.

Advantages of steering transaxle 1A representing later-discussed steering transaxles 1B to 1H, in comparison with a conventional steering transaxle including a mechanical differential gear unit, will be described.

Hydraulic motors 3L and 3R for driving respective steerable wheels 9L and 9R are fluidly connected in parallel to a common hydraulic pump, so that hydraulic motors 3L and 3R can differentially rotate to drive wheels 9L and 9R in correspondence to the difference of load between wheels 9L and 9R occurring during the turning of a vehicle or so on. Therefore, steering transaxle 1A without a mechanical differential gear unit can be compacted radially (vertically and in the fore-and-aft direction of a vehicle) while ensuring the differential function. Such compacted steering transaxle 1A can be disposed so as to ensure a large ground clearance.

Transaxle 1A including the hydraulic motors 3L and 3R for driving respective steerable wheels 9L and 9R is provided with hydraulic ports and flexible pipes instead of a propeller shaft for inputting power from another transmission separated from transaxle 1A, thereby expanding a free space under a chassis of a vehicle. The free space may be used for disposing a mid-mount working device such as a mower unit, or the vehicle chassis may be lowered so as to reduce the free space, thereby facilitating the riding of the vehicle.

The displacements of hydraulic motors 3L and 3R can be changed by controlling tilt angles of their movable swash plates 33L and 33R in correspondence to turning angle of steerable wheels 9L and 9R. Therefore, steerable wheels 9L and 9R can be accelerated or decelerated during turning of a vehicle so as to prevent the dragging of wheels 9L and 9R which may damage the ground surface.

A hydraulic circuit of hydraulic motors 3L and 3R can also serve as a torque limiter for absorbing peak torque occurring when at least one of wheels 9L and 9R is excessively loaded.

The switching system, such as differential locking system 5 of steering transaxle 1A as shown in FIG. 1, can cancel or restrict differential rotation of hydraulic motors 3L and 3R so as to facilitate a stuck vehicle to easily escape from a ditch or mud.

Referring to FIG. 1, the external and internal structure of transaxle casing 2 will be detailed. Left and right bearing plates 7L and 7R abut against each other, and left and right motor casing parts 2L and 2R are disposed so as to sandwich bearing plates 7L and 7R, thereby constituting transaxle casing 2.

A bracket 8 is formed on the top of left motor casing part 2L. A center pin 6 disposed in the fore-and-aft direction of a vehicle is passed through bracket 8 so as to pivotally hang transaxle 1A from the vehicle.

Left hydraulic motor 3L, including a center section 31L, a cylinder block 32L, movable swash plate 33L and a motor shaft 4L, is disposed in left motor casing part 2L. Right hydraulic motor 3R, including a center section 31R, a cylinder block 32R, movable swash plate 33R and a motor shaft 4R, is disposed in right motor casing part 2R. Motor casing parts 2L and 2R are filled with hydraulic fluid so as to serve as fluid sumps, in which respective hydraulic motors 3L and 3R are immersed.

Center sections 31L and 31R, fixed in respective motor casing parts 2L and 2R, have vertical surfaces, onto which respective cylinder blocks 32L and 32R are slidably rotatably mounted. Laterally horizontal motor shafts 4L and 4R are disposed coaxially to each other. Bearings 14L and 14R are fitted in respective bearing plates 7L and 7R so as to journal proximal ends of motor shafts 4L and 4R. Motor shafts 4L and 4R are rotatably passed through respective center sections 31L and 31R.

Cylinder block 32L and movable swash plate 33L are disposed between bearing plate 7L and center section 31L, and cylinder block 32R and movable swash plate 33R between bearing plate 7R and center section 31R. Motor shaft 4L and 4R are freely passed through respective movable swash plates 33L and 33R, and not-relatively rotatably passed through respective cylinder blocks 32L and 32R so as to serve as rotary center axes of respective cylinder blocks 32L and 32R. Pistons are reciprocally fitted into each of cylinder blocks 32L and 32R through respective springs and pressed at heads thereof against each of movable swash plates 33L and 33R.

Figure 2:
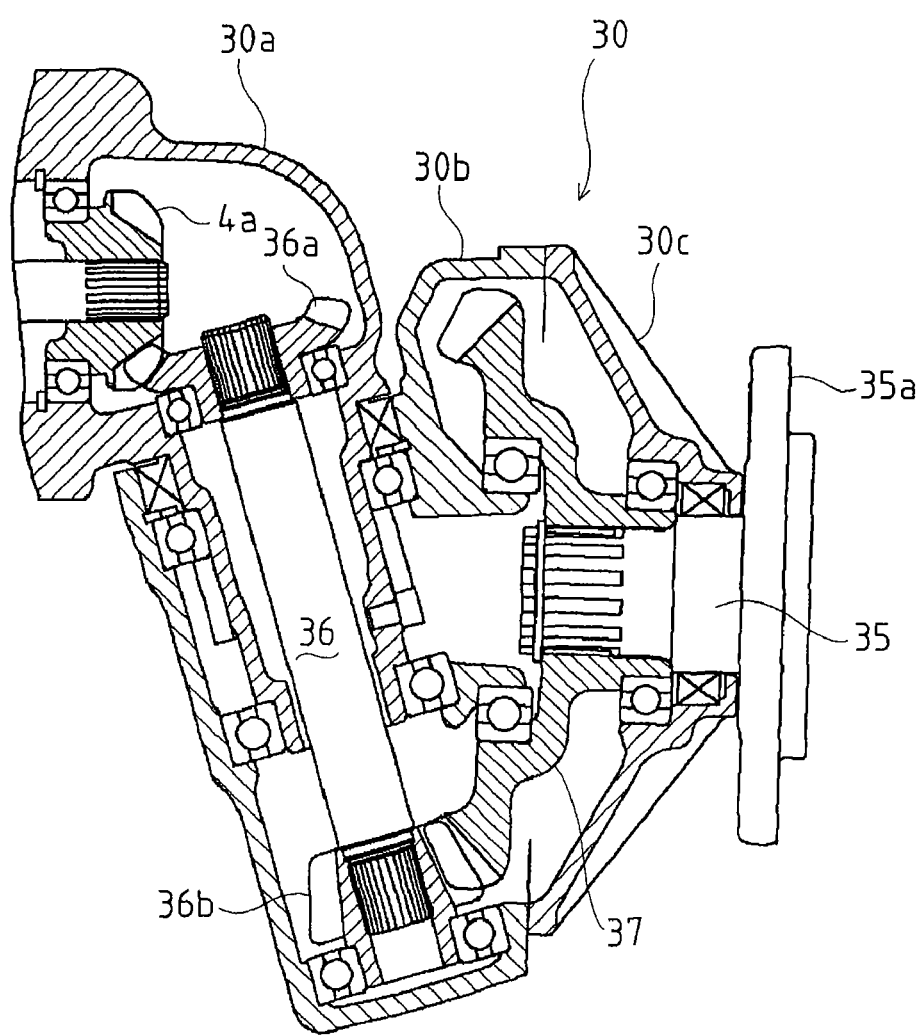
FIG. 2 is a sectional rear view of a wheel support unit 30 provided for each of steering transaxles 1A to 1H.
Figure 3:
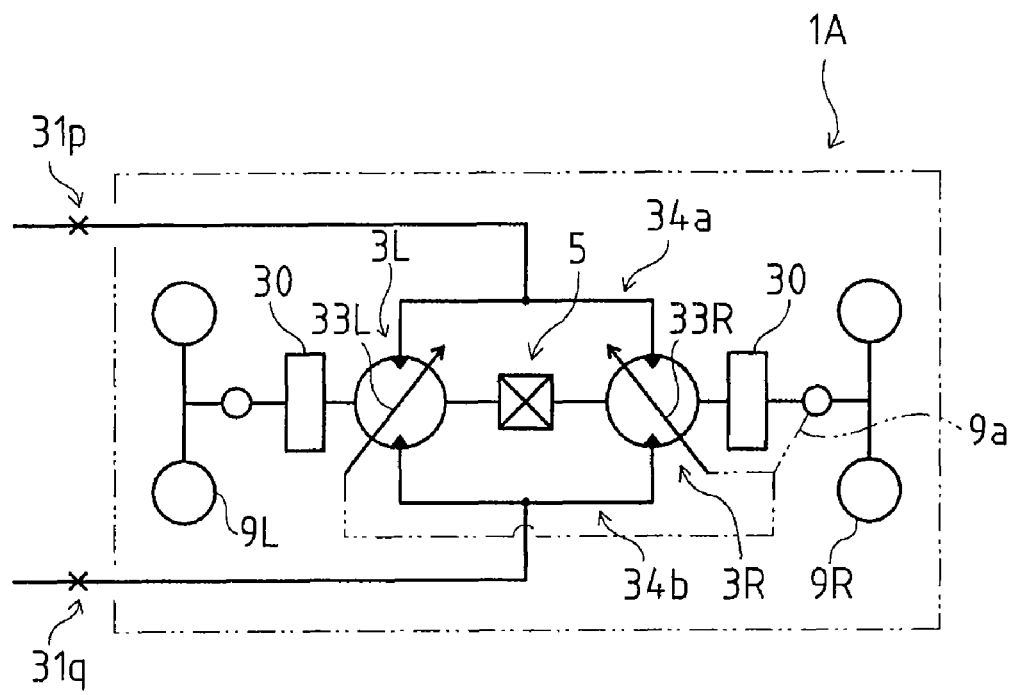
FIG. 3 is a structural and hydraulic circuit diagram of steering transaxle 1A.

As shown in FIG. 3, the tilt angles of movable swash plates 33L and 33R are changed in association with steered angles of steerable wheels 9L and 9R or an operation degree of the steering operation device, e.g., a turning angle of a steering wheel. Each of wheel support units 30 has a later-discussed steered casing 30b, as shown in FIG. 2, which may be interlockingly connected to swash plates 33L and 33R.

As shown in FIGS. 1 and 3, hydraulic ports 31p and 31q (hydraulic port 31q hides behind hydraulic port 31p in FIG. 1) are fitted into one of center sections 31L and 31R (in this embodiment, left center section 31L) and project outward (downward) from a bottom surface of left motor casing part 2L. Pipes are connected to ports 31p and 31q so as to supply fluid from a hydraulic pump to hydraulic motors 3L and 3R, and to return fluid from hydraulic motors 3L and 3R to the hydraulic pump.

As shown in FIGS. 1 and 3, in transaxle casing 2, two pipes 34a and 34b are interposed between center sections 31L and 31R, as shown in FIGS. 1 and 3 (pipe 34b hides behind pipe 34a in FIG. 1), thereby constituting respective bifurcating passages 24a and 24b. The bifurcating passage 24a is interposed between port 31p and motors 3L and 3R, and bifurcating passage 24b between port 31q and motors 3L and 3R. When a vehicle travels in one of forward and backward directions, hydraulic port 31p receives fluid from the hydraulic pump, bifurcating passage 24a distributes fluid from port 31p between motors 3L and 3R, and bifurcating passage 24b collects fluid from motors 3L and 3R and returns it to the hydraulic motor through port 31q. When a vehicle travels in the other of forward and backward directions, hydraulic port 31q receives fluid from the hydraulic pump, bifurcating passage 24b distributes fluid from port 31q between motors 3L and 3R, and bifurcating passage 24a collects fluid from motors 3L and 3R and returns it to the hydraulic motor through port 31p.

Bearing plates 7L and 7R are recessed, and the recesses of bearing plates 7L and 7R face each other so as to make a chamber 7H between bearing plates 7L and 7R. The proximal ends of motor shafts 4L and 4R penetrating respective bearings 17L and 17R are inserted into chamber 7H and disposed adjacent to each other.

Each of left and right wheel support units 30 will be described with reference to FIG. 2 illustrating representative right wheel support unit 30. A kingpin casing 30a is fixed to each of axial outer ends of transaxle casing 2 (the outer end of each of motor casing parts 2L and 2R). A distal end of each of motor shafts 4L and 4R is journalled in kingpin casing 30a, and fixedly provided thereon with a bevel gear 4a. Kingpin casing 30a is bent to have a downwardly extending portion. A kingpin shaft 36 is coaxially disposed in the downwardly extending portion of kingpin casing 30a. A bevel gear 36a is fixed on a top end of kingpin shaft 36, and meshes with bevel gear 4a. Kingpin shaft 36 is journalled by kingpin casing 30a through bevel gear 4a and a bearing.

A steerable casing 30b is provided on the downwardly extending portion of kingpin casing 30a through bearings so as to be rotatable around kingpin casing 30a. Kingpin shaft 36 projects downward from a bottom end of the downwardly extending portion of kingpin casing 30a. A bevel gear 36b is fixed on a bottom end of kingpin shaft 36, and rotatably supported by a bottom wall of steerable casing 30b through a bearing.

A final bevel gear 37 fixed on a horizontal axle 35 is rotatably supported by steerable casing 30b, and meshes with bevel gear 36b. A cover 30c is disposed around axle 35, and fastened to steerable casing 30b so as to cover and rotatably support final bevel gear 37 with axle 35. An outer end of axle 35 projecting outward from cover 30c is formed into a flange 35a to be attached to each of wheels 9L and 9R.

Differential locking system 5 of steering transaxle 1A as shown in FIG. 1 will be described. The proximal ends of motor shafts 4L and 4R are formed into spline shafts 14L and 14R, respectively. One of spline shafts 14L and 14R (in this embodiment, right spline shaft 14R) is longer than the other. In chamber 7H, a shift collar 5a is slidably fitted on longer spline shaft 14R. Shift collar 5a is shifted between a right differential mode position and a left differential locking mode position. Shift collar 5a at the differential mode position, as the lower portion thereof below spline shafts 14L and 14R shown in FIG. 1, engages with only spline shaft 14R so as to allow the differential rotation of motor shafts 4L and 4R. Shift collar 5a at the differential locking mode position, as the upper portion thereof above spline shafts 14L and 14R shown in FIG. 1, engages with both spline shafts 14L and 14R so as to lock motor shafts 4L and 4R with each other.

Alternatively, another spline shaft may be coaxially disposed between the splined proximal ends of motor shafts 4L and 4R, and left and right shift collars may be slidably fitted on the spline shaft. In this construction, each of the shift collars constantly engaging with the spline shaft can also engage with the corresponding splined end of motor shaft 4L or 4R. When both the shift collars engage with the respective splined ends of motor shafts 4L and 4R, motor shafts 4L and 4R are locked with each other.

To move shift collar 5a, a fork shaft 15b is disposed in parallel to motor shafts 4L and 4R and axially movably penetrates bearing plates 7L and 7R, and a shift fork 15a is interposed between fork shaft 15b and shift collar 5a. Right bearing plate 7R slidably fittingly supports fork shaft 15b therethrough. A guide casing 7c is fixed onto a left surface of left bearing plate 7L and projects leftward in left motor casing part 2L. Guide casing 7c is stepped so as to have a diametrically small left portion and a diametrically large right portion. The left portion of guide casing 7c is substantially diametrically as large as fork shaft 15b so as to slidably fittingly support a left end of fork shaft 15b therein. The right portion of guide casing 7c and a hole of left bearing plate 7L, which pass fork shaft 15b therethrough, are diametrically larger than fork shaft 15b so as to serve as a spring chamber, in which a spring 7s is wounded around fork shaft 15b so as to bias fork shaft 15b rightward, thereby biasing shift collar 5a toward the differential mode position. An opening 7v is provided in a left end of guide casing 7c so as to face the left end surface of fork shaft 15b. Fluid (and air) escapes from guide casing 7c to the fluid sump in left motor casing part 2L through opening 7v so as to smoothen the leftward sliding of fork shaft 15b for the differential locking.

In right motor casing part 2R, a cam 15c is disposed so as to abut against a right end of fork shaft 15b. Cam 15c is fixed through a pivot shaft to an arm 15d disposed out of transaxle casing 2. Arm 15d is operatively connected to a manipulator (such as a differential locking pedal 102 shown in FIG. 19) on a vehicle. By operating the manipulator for setting the differential locking, arm 15d is rotated so that cam 15c rotates to push fork shaft 15b leftward so as to set shift collar 5a to the differential locking mode position. When the manipulator is released, fork shaft 15b returns rightward by the biasing force of spring 7s so as to return shift collar 5a to the differential mode position, thereby returning cam 15c, arm 15d and the manipulator to their initial positions.

Alternatively, arm 15d may be interlockingly connected to a differential locking system in another transaxle (such as a later-discussed unsteering transaxle 20D) so as to be set for locking motor shafts 4L and 4R with each other simultaneously with the setting of differential locking in the other transaxle.

Further alternatively, the rotary speeds of left and right wheels 9L and 9R may be detected so as to decide whether one of wheels 9L and 9R slips or not. If either wheel 9L or 9R slips, arm 15d is automatically rotated for locking motor shafts 4L and 4R with each other.

Figure 4:
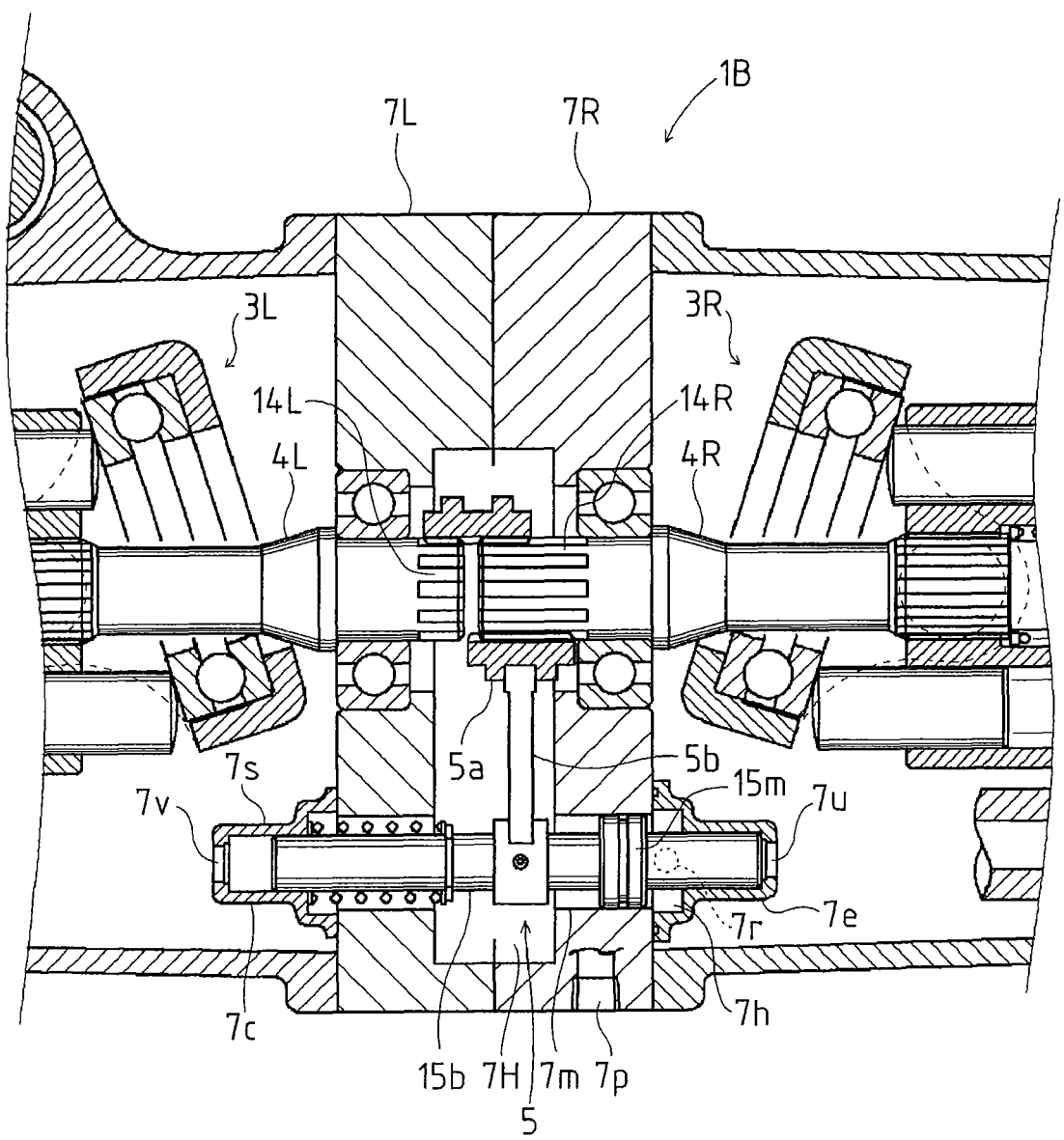
FIG. 4 is a fragmental sectional rear view of a principal portion of a steering transaxle 1B provided with an alternative mechanical differential locking system 5.

FIG. 4 illustrates steering transaxle 1B provided with an alternative mechanical differential locking system 5 in which fork shaft 15b is hydraulically shifted. In addition to guide casing 7c fixed onto left bearing plate 7L, a guide casing 7e is fixed onto a right surface of right bearing plate 7R and projects rightward in right motor casing part 2L. Guide casing 7e is stepped so as to have a diametrically small right portion and a diametrically large left portion. The right portion of guide casing 7e is substantially diametrically as large as fork shaft 15b so as to slidably fittingly support the right end of fork shaft 15b therein. The left portion of guide casing 7e serves as a chamber 7h passing fork shaft 15b therethrough.

A chamber 7m, which is diametrically larger than fork shaft 15b, is formed in right bearing plate 7R so as to pass fork shaft 15b therethrough. A piston 15m is fixed on fork shaft 15b in chamber 7m so as to slidably fit right bearing plate 7R. Continuous chambers 7h and 7m are filled with hydraulic fluid between piston 15m in chamber 7m and the stepped end wall of chamber 7h. Bearing plate 7R is formed therein with a hydraulic port 7p. Guide casing 7e is formed with a port 7r, communicating port 7p in bearing plate 7R to chamber 7h in guide casing 7e. An opening 7u is provided in a right end of guide casing 7e so as to face the right end surface of fork shaft 15b. Fluid (and air) escapes from guide casing 7e to the fluid sump in motor casing part 2R through opening 7u so as to smoothen the sliding of piston 15m on fork shaft 15b.

An unshown hydraulic control valve is fluidly connected to hydraulic port 7p. When the control valve is set to supply fluid to port 7p, the fluid is supplied into continuous chambers 7h and 7m between piston 15m and the stepped end wall of chamber 7h so as to push piston 15m leftward against spring 7s, thereby setting shift collar 5a at the differential locking mode position, as the upper portion thereof above spline shafts 14L and 14R shown in FIG. 4. When the control valve is set to drain fluid from port 7p, the fluid is drained from continuous chambers 7h and 7m between piston 15m and the stepped end wall of chamber 7h, and spring 7s pushes fork shaft 15b rightward so as to return shift collar 5a to the differential mode position, as the lower portion thereof below spline shafts 14L and 14R shown in FIG. 4.

The control valve is operatively connected to a manipulator (such as differential locking pedal 102 shown in FIG. 19) provided on a vehicle. Alternatively, the control valve may be operatively linked with a controlling device for a differential locking system in another transaxle (such as later-discussed unsteering transaxle 20D) so as to be set for locking motor shafts 4L and 4R with each other simultaneously with the setting of differential locking in the other transaxle.

Further alternatively, the rotary speeds of left and right wheels 9L and 9R may be detected so as to decide whether one of wheels 9L and 9R slips or not. If either wheel 9L or 9R slips, the control valve is automatically set for locking motor shafts 4L and 4R with each other.

Figure 5:
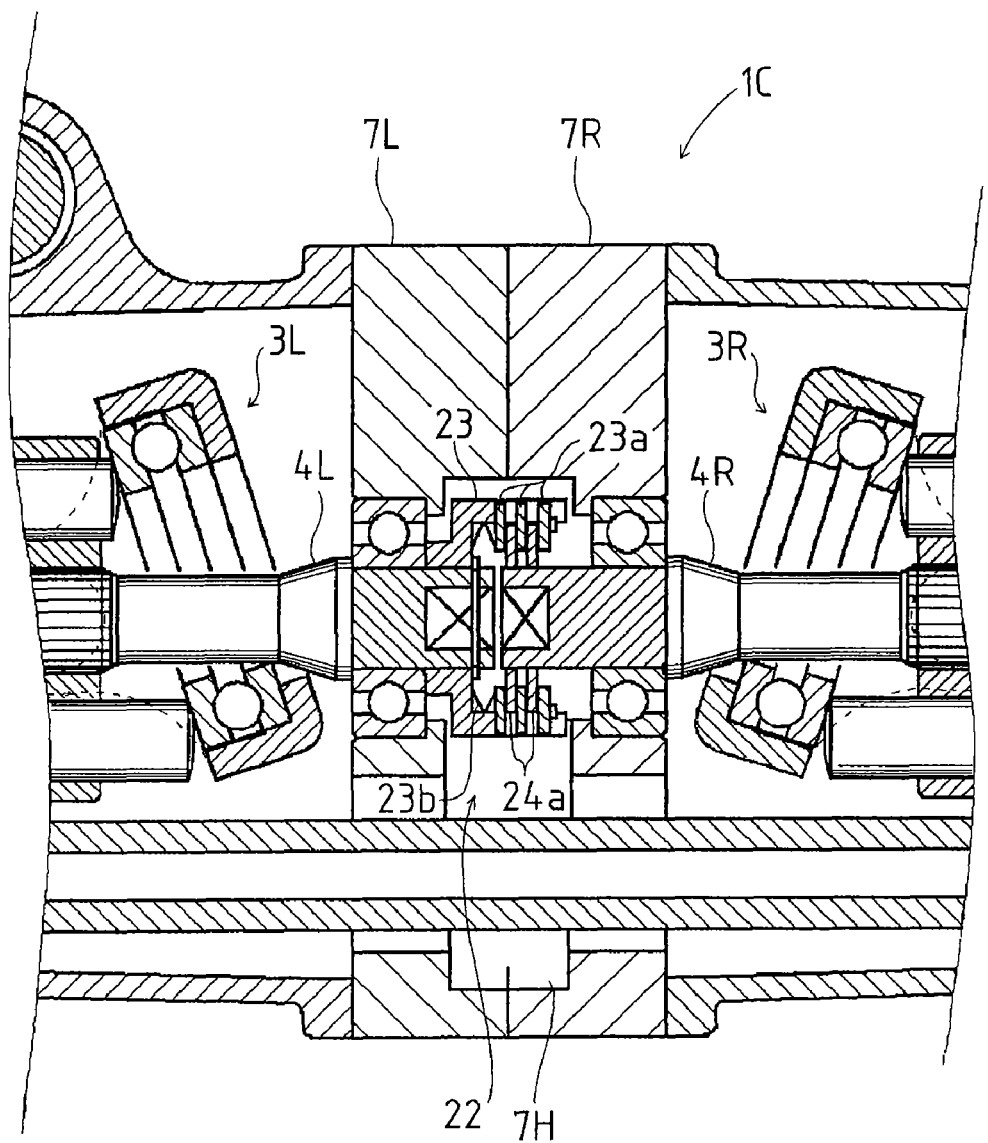
FIG. 5 is a fragmental sectional rear view of a principal portion of a steering transaxle 1C provided with an alternative mechanical differential restriction system 22.

FIG. 5 illustrates steering transaxle 1C provided with a mechanical differential restriction system, i.e., a limited slip differential unit 22. Limited slip differential unit 22 includes means which constantly applies friction force for restricting the differential rotation of motor shafts 4L and 4R.

In chamber 7H between bearing plates 7L and 7R, a drum 23 is fixed on the proximal (right) end of left motor shaft 4L and extended so as to surround the proximal (left) end of right motor shaft 4R. Multi outer friction disks 23a and inner friction disks 24a are alternately aligned between drum 23 and the proximal end of right motor shaft 4R. Outer friction disks 23a are axially slidably and not-relatively rotatably fitted onto the inner peripheral surface of drum 23. Inner friction disks 24a are axially slidably and not-relatively rotatably fitted onto the outer peripheral surface of motor shaft 4R.

A spring 23b is interposed between the left end wall of drum 23 and the most leftward outer friction disk 23a so as to frictionally press disks 23a and 24a against one another. The frictional pressure among disks 23a and 24a restricts the differential rotation of motor shafts 4L and 4R.

Limited slip differential unit 22 may include alternative means for restricting the differential rotation of motor shafts 4L and 4R, such as a viscous coupling.

Figure 6:
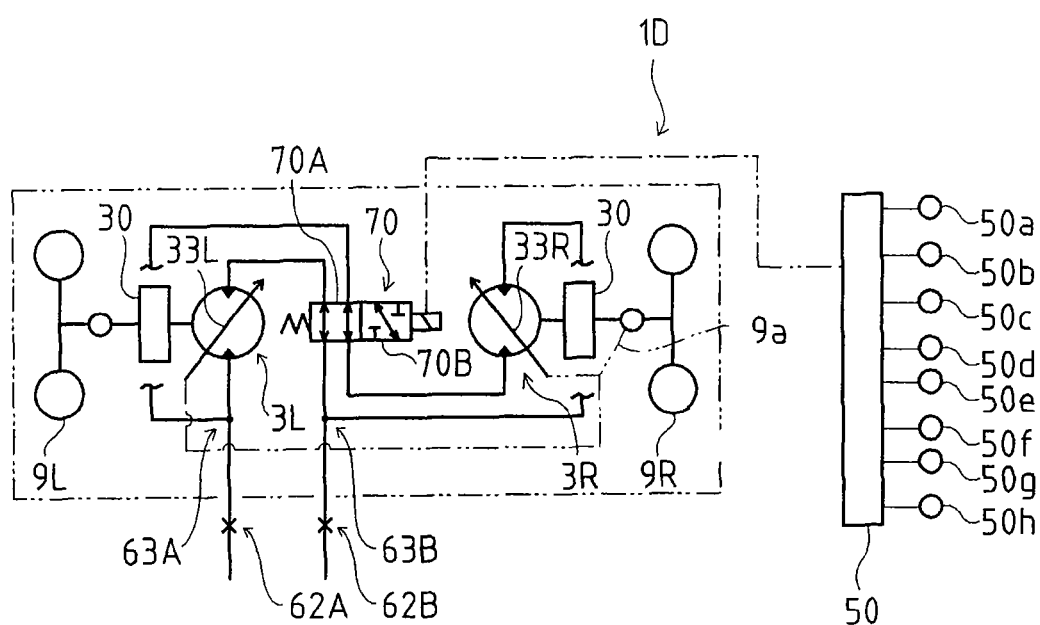
FIG. 6 is a structural and hydraulic circuit diagram of a steering transaxle 1D incorporating hydraulic motors 3L and 3R provided with a hydraulic differential locking system including an electrically controlled switching valve 70.

Referring to FIG. 6, steering transaxle 1D including hydraulic motors 3L and 3R is provided with a hydraulic circuit system which can cancel or restrict the differential rotation of motor shafts 4L and 4R, instead of mechanical systems 5 and 22.

The hydraulic circuit system includes a switching valve 70. Switching valve 70 is normally set at a differential mode position 70A for fluidly connecting motors 3L and 3R in parallel to the common hydraulic pump, and optionally set at a differential locking mode position 70B for connecting motors 3L and 3R in tandem to the common hydraulic pump.

Steering transaxle 1D has a pair of externally open hydraulic ports 62A and 62B. In the hydraulic circuit system, a bifurcating point 63A is disposed between hydraulic motor 3L and switching valve 70, and a bifurcating point 63B between hydraulic motor 3R and switching valve 70. When port 62A receives fluid from the common hydraulic pump and switching valve 70 is set at differential mode position 70A, bifurcating point 63A distributes fluid from port 62A between hydraulic motor 3L and switching valve 70. The flow of fluid from bifurcating point 63A through hydraulic motor 3L is passed to bifurcating point 63B by switching valve 70. The fluid from bifurcating point 63A without passing hydraulic motor 3L is supplied to hydraulic motor 3R by switching valve 70, and discharged from hydraulic motor 3R to bifurcating point 63B. The two flows of fluid are collected at bifurcating point 63B, and discharged to port 62B.

When port 62B receives fluid from the common hydraulic pump and switching valve 70 is set at differential mode position 70A, bifurcating point 63B distributes fluid from port 62B between hydraulic motor 3R and switching valve 70. The flow of fluid from bifurcating point 63B through hydraulic motor 3R is passed to bifurcating point 63A by switching valve 70. The fluid from bifurcating point 63B without passing hydraulic motor 3R is supplied to hydraulic motor 3L by switching valve 70, and discharged from hydraulic motor 3L to bifurcating point 63A. Bifurcating point 63A collects the two flows of fluid and discharges the collected fluid to port 62A.

In this way, while switching valve 70 is set at differential mode position 70A, fluid flowing between ports 62A and 62B is distributed between motors 3L and 3R so that the distribution rate of fluid between motors 3L and 3R varies depending upon how motors 3L and 3R are loaded. Therefore, motors 3L and 3R are differentially driven.

When port 62A receives fluid from the common hydraulic pump and switching valve 70 is set at differential locking mode position 70B, bifurcating point 63A distributes fluid from port 62A between hydraulic motor 3L and switching valve 70. The flow of fluid from bifurcating point 63A without passing hydraulic motor 3L is shut off by switching valve 70. The fluid from bifurcating point 63A through hydraulic motor 3L is supplied to hydraulic motor 3R by switching valve 70, and discharged from hydraulic motor 3R to bifurcating point 63B. Only the flow through the hydraulic motor 3R is passed through bifurcating point 63B to port 62B.

When port 62B receives fluid from the common hydraulic pump and switching valve 70 is set at differential locking mode position 70B, bifurcating point 63B distributes fluid from port 62B between hydraulic motor 3R and switching valve 70. The flow of fluid from bifurcating point 63B without passing hydraulic motor 3R is shut off by switching valve 70. The fluid from bifurcating point 63B through hydraulic motor 3R is supplied to hydraulic motor 3L by switching valve 70, and discharged from hydraulic motor 3L to bifurcating point 63A. Only the flow through the hydraulic motor 3L is passed through bifurcating point 63A to port 62A.

In this way, while switching valve 70 is set at differential locking mode position 70B, fluid flowing between ports 62A and 62B passes motors 3L and 3R in tandem. Therefore, each of motors 3L and 3R is supplied with all the fluid flowing between ports 62A and 62B so as to be driven at the same speed.

As shown in FIG. 6, switching valve 70 is a solenoid valve electrically controlled by a controller 50. A manipulator for differential locking (such as differential locking pedal 102 shown in FIG. 19) is provided on a vehicle, and controller 50 controls switching valve 70 based on detection of the operational condition of the manipulator. Alternatively or additionally, controller 50 may decide whether one of wheels 9L and 9R slips or not based on detection of the difference of rotary speed between left and right wheels 9L and 9R. If either wheel 9L or 9R slips, switching valve 70 is automatically switched from differential mode position 70A to differential locking position 70B. Alternatively or additionally, switching valve 70 may be manually controlled in connection with a manipulator provided on a vehicle.

Figure 7:
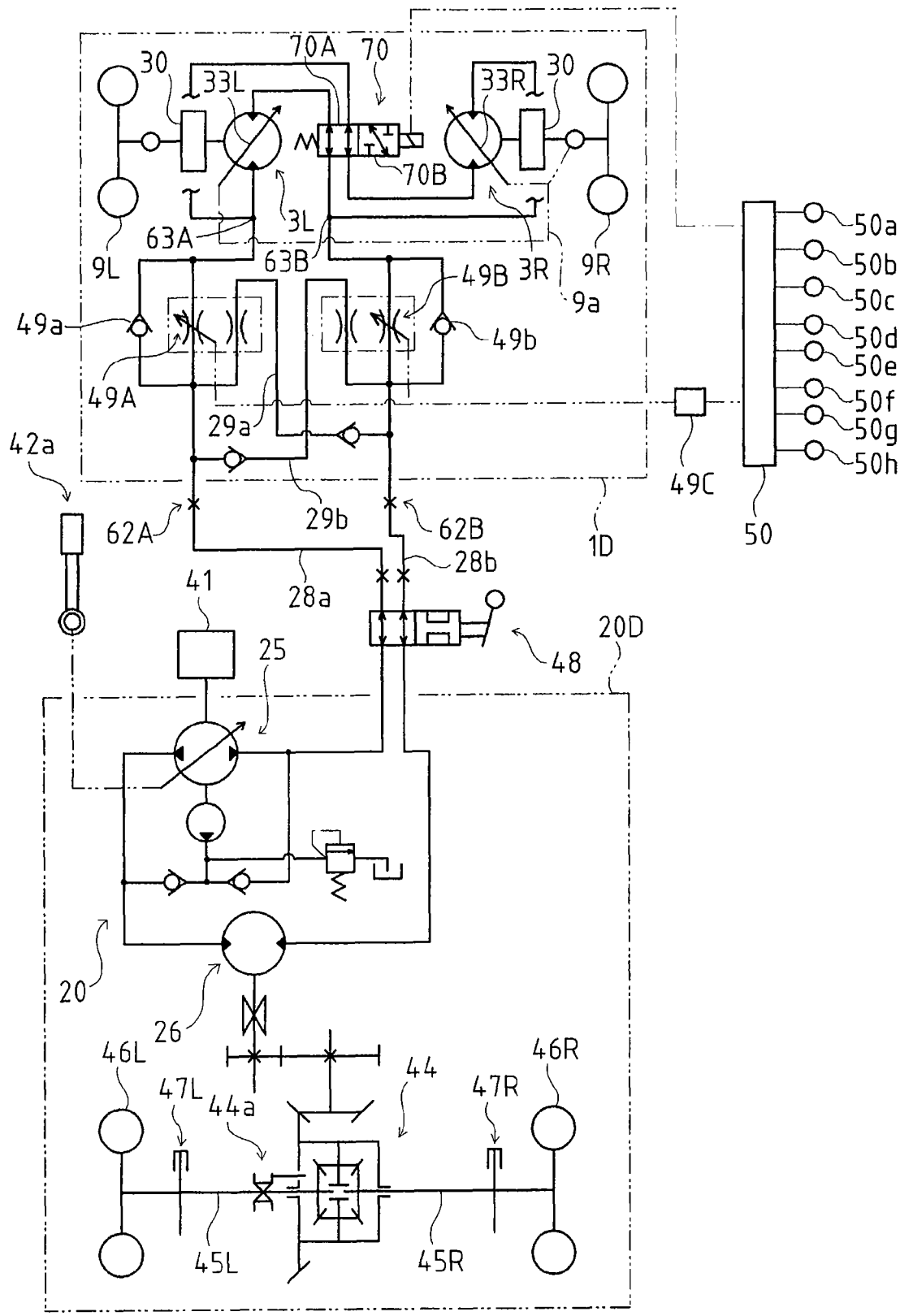
FIG. 7 is a structural and hydraulic circuit diagram of a four-wheel driving vehicle equipped with steering transaxle 1D and an unsteering transaxle 20D.

FIG. 7 illustrates a four-wheel driving vehicle equipped with an engine 41, steering transaxle 1D and an unsteering transaxle 20D. Steering transaxle 1D drives steerable wheels 9L and 9R, and unsteering transaxle 20D drives unsteerable wheels 46L and 46R. Either the pair of wheels 9L and 9R or the pair of wheels 46L and 46R serve as front wheels, and the other pair serve as rear wheels.

Unsteering transaxle 20D incorporates an HST 20 including a variable displacement hydraulic pump 25 and a hydraulic motor 26 fluidly connected to each other. Hydraulic pump 25 is driven by engine 41. Unsteering transaxle 20D also incorporates a differential gear unit 44 and axles 45L and 45R, onto which respective wheels 46L and 46R are attached out of unsteering transaxle 20D. Hydraulic motor 26 drives axles 45L and 45R through differential gear unit 44.

Hydraulic pump 25 has a movable swash plate interlocking with a speed control manipulator 42a (in FIG. 6, it is a lever, alternatively, it may be a pedal). The tilt angle and direction of the movable swash plate are changed by operation of manipulator 42a so as to change the rotary speed and direction of motor 26, i.e., axles 45L and 45R.

Unsteering transaxle 20D incorporates brakes 47L and 47R for braking respective axles 45L and 45R. Brakes 47L and 47R can be simultaneously operated for braking. Two braking operation devices (such as brake pedals 105 and 106 shown in FIG. 19) may be provided on a vehicle to be operatively connected to respective brakes 47L and 47R so that only one of brakes 47L and 47R may be operated for brake turn (zero turn) of the vehicle.

Differential gear unit 44 is provided with a differential locking mechanism 44a operatively connected to a manipulator (such as differential locking pedal 102 shown in FIG. 19) provided on the vehicle. As mentioned above, the manipulator may be operated to simultaneously operate differential locking mechanism 44a and switching valve 70 for differential locking of all wheels 9L, 9R, 46L and 46R.

Hydraulic pump 25 can be also fluidly connected through a switching valve 48 to hydraulic motors 3L and 3R in steering transaxle 1D. In this regard, pipes 28a and 28b are extended from unsteering transaxle 20D to be connected to respective ports 62A and 62B. Switching valve 48 is disposed across pipes 28a and 28b. Switching valve 48 set at the two-wheel drive mode position makes a closed circuit of HST 20 and a closed circuit of hydraulic motors 3L and 3R isolated from the closed circuit of HST 20.

Switching valve 48 set at the four-wheel drive mode position opens pipes 28a and 28b so as to fluidly connect HST 20 to hydraulic motors 3L and 3R. In this state, hydraulic motor 26 is fluidly connected in tandem with the pair of motors 3L and 3R to hydraulic pump 25. When switching valve 70 is disposed at differential mode position 70A, motors 3L and 3R are fluidly connected in parallel between hydraulic pump 25 and motor 26. When switching valve 70 is disposed at differential locking mode position 70B, all the three motors 26, 3L and 3R are fluidly connected in tandem to hydraulic pump 25.

A flow control valve 49A and a bypass (check) valve 49a are interposed in parallel between port 62A and bifurcating point 63A. A flow control valve 49B and a bypass (check) valve 49b are interposed in parallel between port 62B and bifurcating point 63B. Each of bypass valves 49a and 49b passes fluid overflowing corresponding flow control valve 49A or 49B. The opening degrees of flow control valves 49A and 49B are adjusted by an actuator 49C electrically controlled by controller 50.

Bypass passages 29a and 29b with respective orifices and check valves are interposed between the passage between port 62A and bifurcating point 63A and the passage between port 62B and bifurcating point 63B. When the passage between port 62A and bifurcating point 63A is hydraulically pressured excessively higher than the passage between port 62B and bifurcating point 63B, the check valve of bypass passage 29a is opened to pass fluid from the higher-pressured passage between port 62A and bifurcating point 63A through the orifice of bypass passage 29a to the lower-pressured passage between port 62B and bifurcating point 63B. When the passage between port 62B and bifurcating point 63B is hydraulically pressured excessively higher than the passage between port 62A and bifurcating point 63A, the check valve of bypass passage 29b is opened to pass fluid through the orifice of bypass passage 29b from the higher-pressured passage between port 62B and bifurcating point 63B to the lower-pressured passage between port 62A and bifurcating point 63A.

Figure 19:
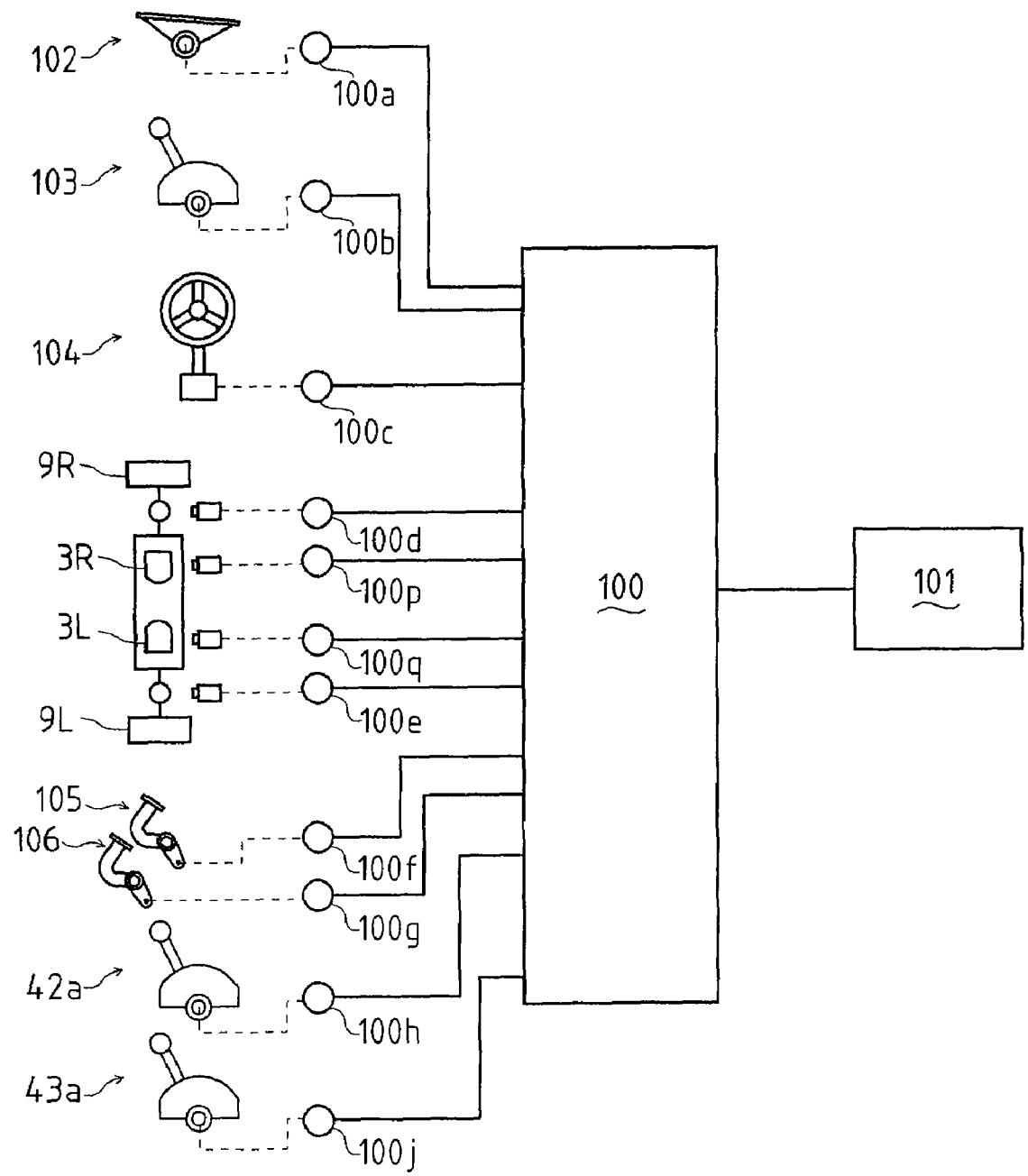
FIG. 19 is a block diagram of a representative electric control system for the differential locking or restriction system.

Controller 50 is provided with detection means including a sensor 50a for detecting the operational condition of a manipulator for differential locking (such as differential locking pedal 102 shown in FIG. 19), a sensor 50b for detecting the operational condition of a lifter (such as a lift lever 103 shown in FIG. 19) for a working machine (in such a case where the vehicle is a tractor equipped with a working machine), a sensor 50c for detecting the steering condition of the vehicle (such as the turning angle of steerable wheels 9L and 9R or of steering wheel 104 as shown in FIG. 19), rotary speed sensors 50d and 50e for detecting rotary speeds of respective steerable wheels 9L and 9R, brake sensors 50f and 50g for detecting the operational condition of respective brake operation devices (such as depression of respective brake pedals 105 and 106 shown in FIG. 19) for respective brakes 47L and 47R, and a sensor 50h for detecting the operational condition of speed control manipulator 42a.

Controller 50 switches switching valve 70 based on a detection signal from sensor 50a. Controller 50 may switch switching valve 70 based on detection signals from sensors 50d and 50e so as to set switching valve 70 at differential locking mode position 70B when either wheel 9L or 9R slips. Further, controller 50 controls actuator 49C based on a detection signal from any of sensors 50a, 50b, 50c, 50d, 50e, 50f, 50g and 50h.

Movable swash plates 33L and 33R are operated in association with the left or right turning angle of steerable wheels 9L and 9R (or steering wheel 104 as shown in FIG. 19) so that wheels 9L and 9R rotate faster than wheels 46L and 46R during turning of the vehicle, thereby preventing dragging of wheels 9L and 9R or wheels 46L and 46R. For example, the rotary speed of wheels 9L and 9R is 1⅕-1½ times as large as that of wheels 46L and 46R during turning of the vehicle.

Figure 8:
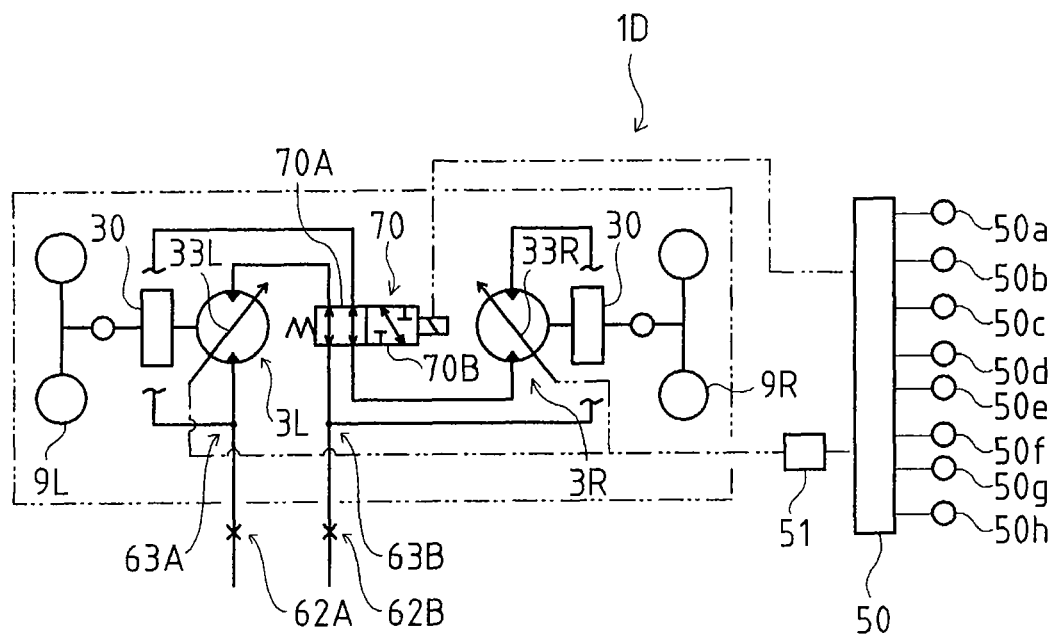
FIG. 8 is a structural and hydraulic circuit diagram of steering transaxle 1D when movable swash plates 33L and 33R of hydraulic motors 3L and 3R are controlled by an electrically controlled actuator 51.

In FIGS. 6 and 7, movable swash plates 33L and 33R are interlockingly connected through a mechanical linkage 9a to the steering mechanism of one of steerable wheels 9L and 9R (such as steerable casing 30b of one of left and right wheel support units 30). Alternatively, as shown in FIG. 8, steering transaxle 1D may be provided with an actuator 51 for controlling movable swash plates 33L and 33R. Controller 50 electrically controls actuator 51 based on a detection signal from sensor 50c for detecting the turning angle of steerable wheels 9L and 9R (or the turning angle of steering wheel 104 as shown in FIG. 19).

When the steering operation device is operated to minimize the turning radius, (e.g., when steering wheel 104 as shown in FIG. 19 is fully rotated from its straight traveling position), and when one of brakes 47L and 47R is operated for brake turn of the vehicle, (e.g., one of brake pedals 105 and 106 as shown in FIG. 19 is depressed), controller 50 controls actuator 49C so as to increase the opening degrees of flow control valves 49A and 49B, thereby increasing fluid supplied to hydraulic motors 3L and 3R. Therefore, steerable wheels 9L and 9R are further accelerated during the brake turn of the vehicle with the steering and braking operations in comparison with those during the normal turning of the vehicle with only the steering operation. In other words, the difference of rotary speed between steerable wheels 9L and 9R and unsteerable wheels 46L and 46R is increased during the brake turn of the vehicle in comparison with that during the normal turning of the vehicle. For example, during the brake turn of the vehicle, the rotary speed of wheels 9L and 9R is twice as large as that of wheels 46L and 46R.

Such further acceleration of steerable wheels 9L and 9R during the brake turn of the vehicle can be ensured by the opening control of flow control valves 49A and 49B so as to require no further movement of swash plates 33L and 33R, thereby reducing the movement range of swash plates 33L and 33R.

If switching valve 70 is set at differential locking mode position 70B, each of hydraulic motors 3L and 3R fluidly connected in tandem to hydraulic pump 25 is supplied with all the fluid from hydraulic pump 25. Therefore, when switching valve 70 is set at differential locking mode position 70B during the brake turn of the vehicle, excessive fluid may be supplied to hydraulic motors 3L and 3R so as to suddenly accelerate wheels 9L and 9R. Thus, controller 50 controls actuator 49C so as to reduce the opening degrees of flow control valves 49A and 49B, thereby preventing sudden acceleration of wheels 9L and 9R.

In this way, the relative speed of wheels 9L and 9R to wheels 46L and 46R is adjusted by the control of opening degree of flow control valves 49A and 49B corresponding to the brake turning operation and the differential locking operation.

Alternatively, if steering transaxle 1D shown in FIG. 8 is used, controller 50 can optimally control actuator 51 to direct movable swash plates 33L and 33R in correspondence to the brake turning operation or the differential locking operation. Thus, flow control valves 49A and 49B and a mechanism for controlling them need not be used.

Figure 9:
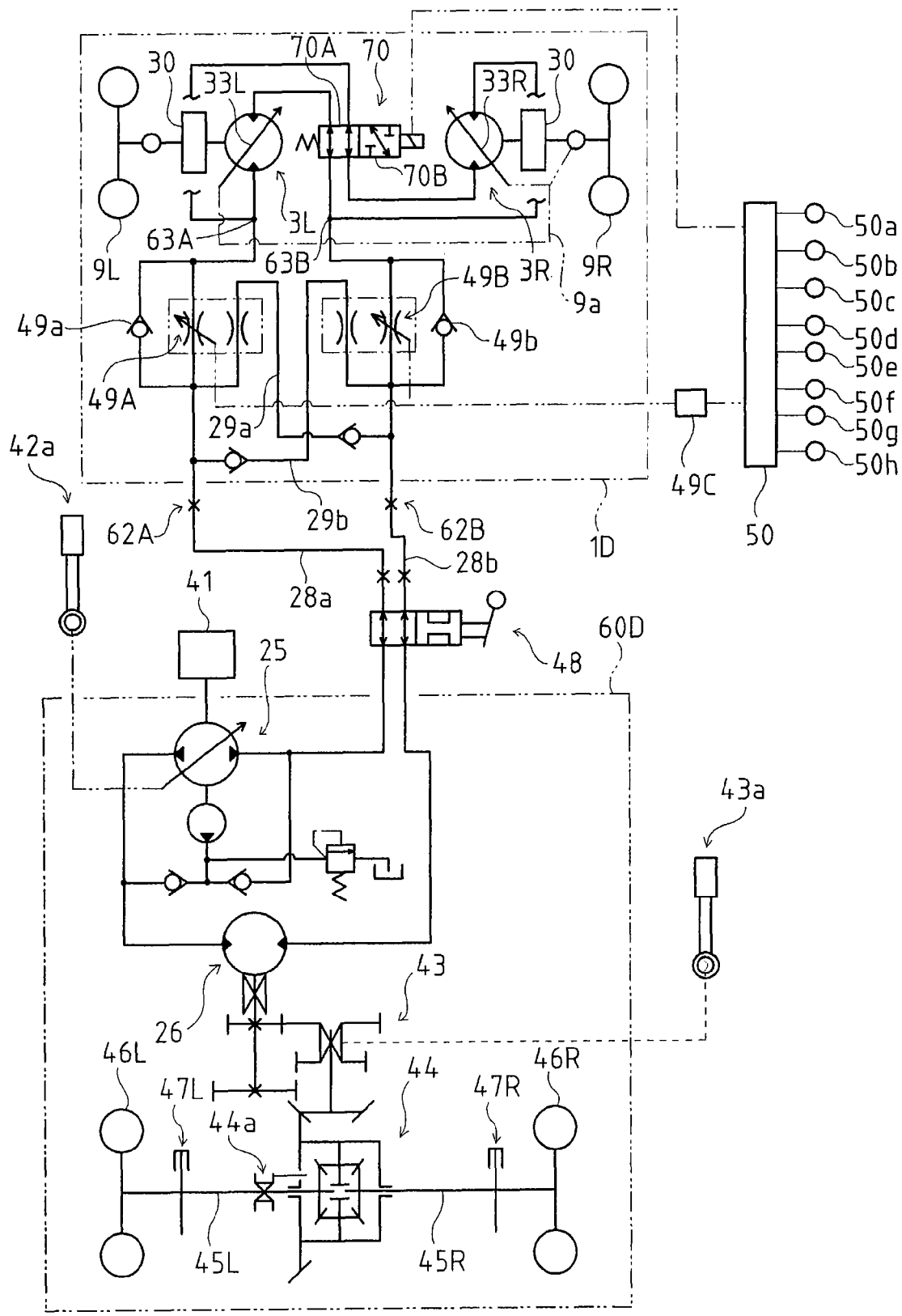
FIG. 9 is a structural and hydraulic circuit diagram of a four-wheel driving vehicle equipped with steering transaxle 1D and an unsteering transaxle 60D.

FIG. 9 illustrates a four-wheel driving vehicle equipped with engine 41, steering transaxle 1D for driving steerable wheels 9L and 9R, and an unsteering transaxle 60D for driving unsteerable wheels 46L and 46R. In comparison of FIG. 9 with FIG. 7, description will be omitted of those parts and structures designated by the same reference numerals, whose functions are identical.

Similar to unsteering transaxle 20D, unsteering transaxle 60D incorporates HST 20 including hydraulic pump 25 and motor 26, differential gear unit 44, and axles 45L and 45R. While HST 20 serves as a main speed changing unit, unsteering transaxle 60D incorporates a mechanical auxiliary speed changing gear unit 43 interposed between hydraulic motor 26 and differential gear unit 44. A manipulator 43a for operating auxiliary speed changing gear unit 43 is disposed on the vehicle shown in FIG. 9.

Figure 10:
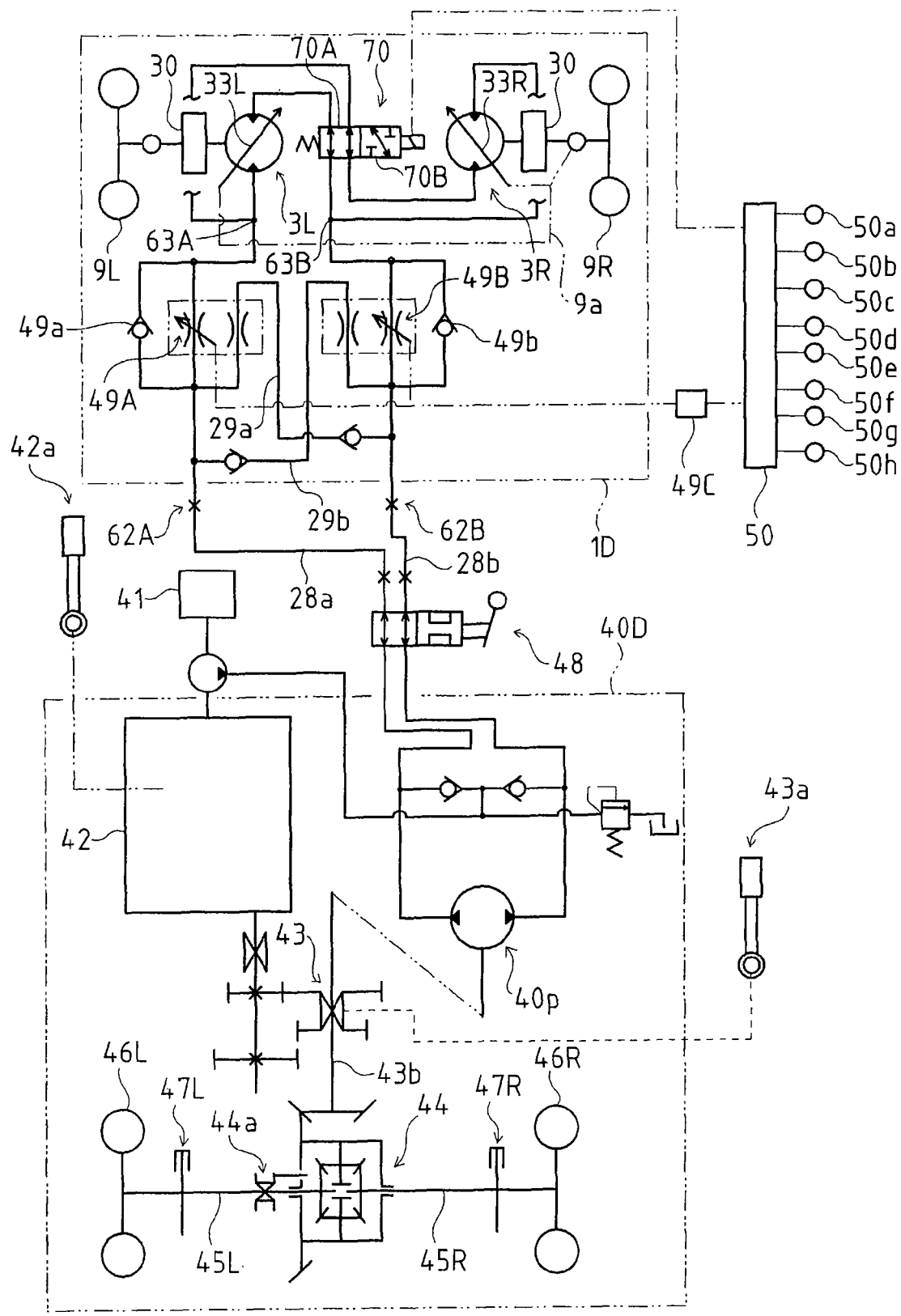
FIG. 10 is a structural and hydraulic circuit diagram of a four-wheel driving vehicle equipped with steering transaxle 1D and an unsteering transaxle 40D.

FIG. 10 illustrates a vehicle equipped with engine 41, steering transaxle 1D for driving steerable wheels 9L and 9R, and an unsteering transaxle 40D for driving unsteerable wheels 46L and 46R. In comparison between FIG. 10 with FIGS. 7 and 9, description will be omitted of those parts and structures designated by the same reference numerals, whose functions are identical.

Similar to unsteering transaxles 20D and 60D, unsteering transaxle 40D incorporates differential gear unit 44 and axles 45L and 45R driven by differential gear unit 44. To drive wheels 46L and 46R, unsteering transaxle 40D incorporates a main speed changing unit 42, which is driven by engine 41 and operatively connected to main speed changing manipulator 42a. A hydraulic clutch system and an HMT (hydraulically mechanical transmission) are examples of main speed changing unit 42. If main speed changing unit 42 is an HMT, a later-discussed hydraulic pump 40p may be used for the HMT.

Unsteering transaxle 40D incorporates mechanical auxiliary speed changing gear unit 43 interposed between main speed changing unit 42 and differential gear unit 44. Auxiliary speed changing gear unit 43 includes a final pinion shaft 43b on which a final pinion is fixed to mesh with a bull gear of differential gear unit 44.

Unsteering transaxle 40D incorporates hydraulic pump 40p for power taking off to hydraulic motors 3L and 3R in steering transaxle 1D. Final pinion shaft 43b of auxiliary speed changing gear unit 43 also serves as a pump shaft of hydraulic pump 40p.

Pipes 28a and 28b connected to respective ports of hydraulic pump 40p are extended outward from unsteering transaxle 40D and connected to respective ports 62A and 62B of steering transaxle 1D, and switching valve 48 is provided across pipes 28a and 29b. When switching valve 48 is set at the four-wheel drive mode position, hydraulic motors 3L and 3R are fluidly connected to hydraulic pump 40p. In this state, unsteerable wheels 46L and 46R are driven by tandem speed changing units 42 and 43 in unsteering transaxle 40D, and steerable wheels 9L and 9R are driven by motors 3L and 3R in steering transaxle 1D which are supplied with fluid from hydraulic pump 40p in unsteering transaxle 40D. When switching valve 48 is set at the two-wheel drive mode position, hydraulic motors 3L and 3R are fluidly isolated from hydraulic pump 40p. In this state, only unsteerable wheels 46L and 46R are driven by tandem speed changing units 42 and 43.

Figure 11:
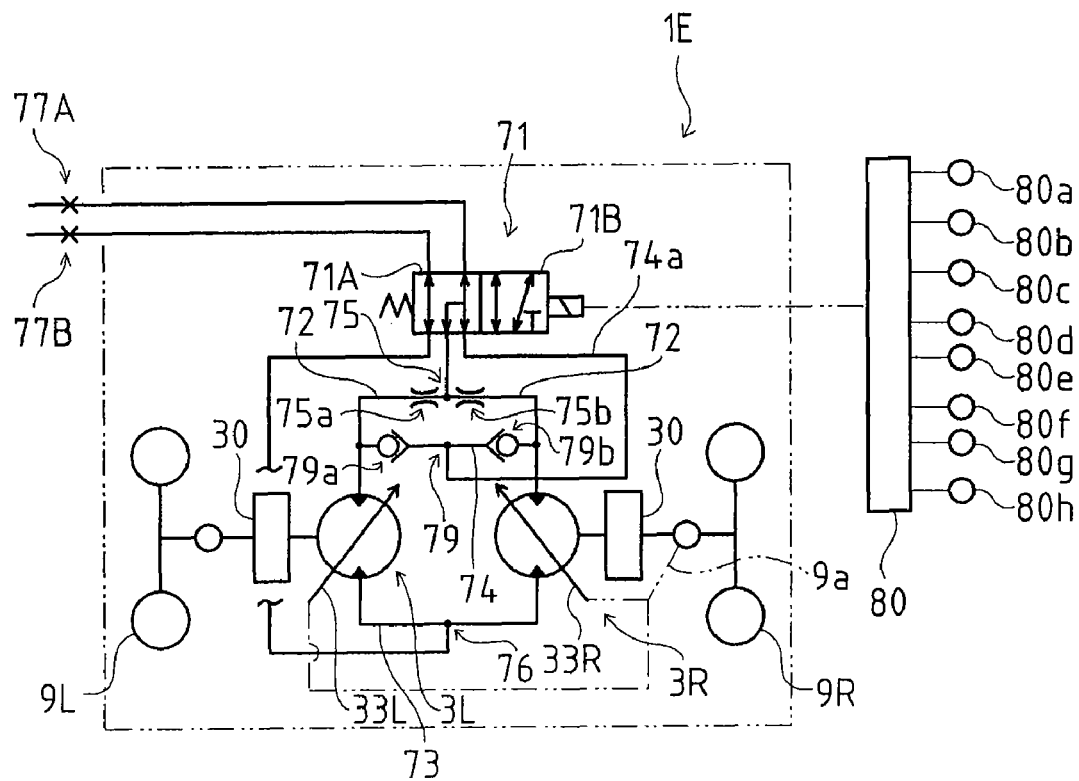
FIG. 11 is a structural and hydraulic circuit diagram of a steering transaxle 1E incorporating hydraulic motors 3L and 3R provided with a hydraulic differential locking system including an electrically controlled switching valve 71.
Figure 1:
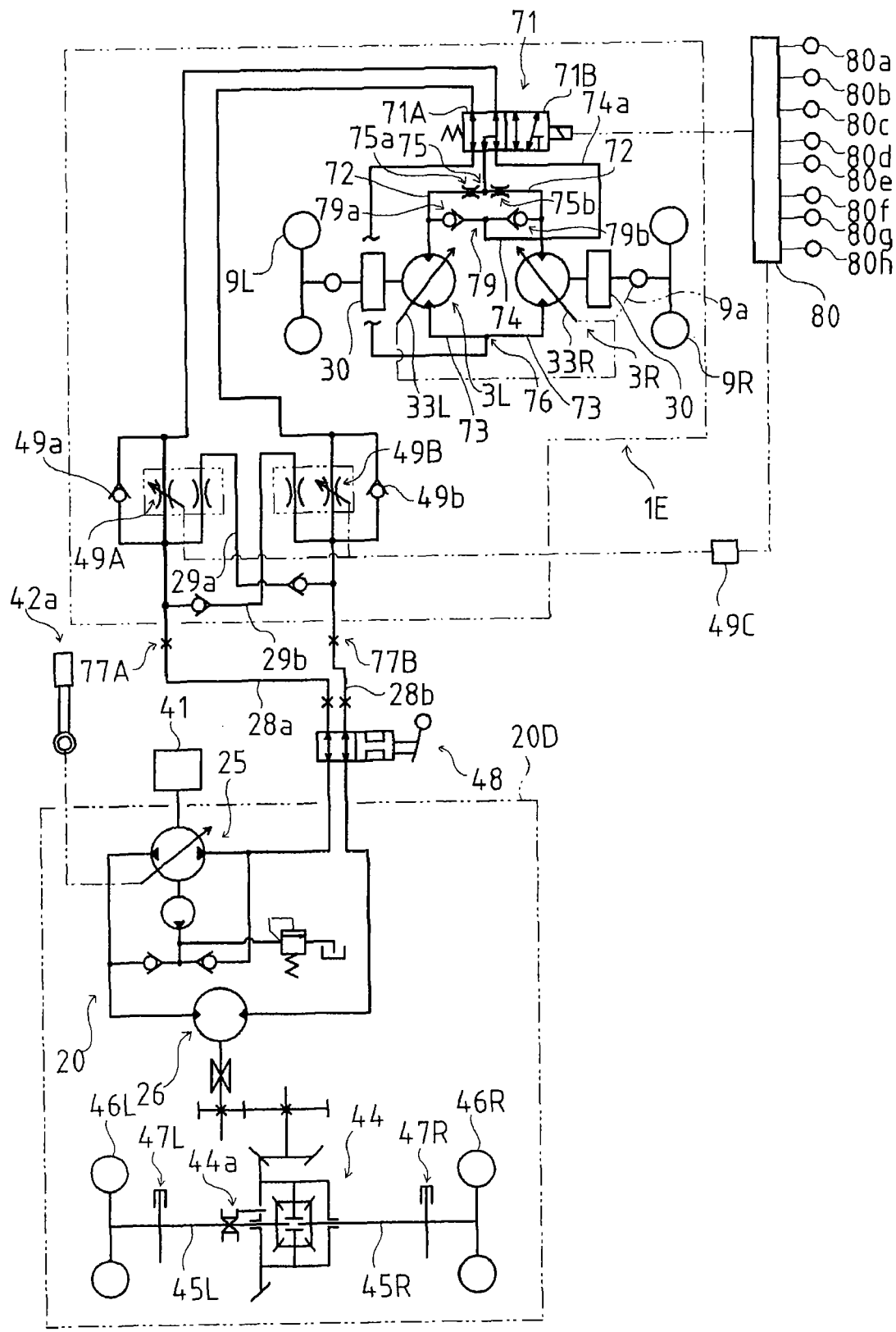

FIG. 11 illustrates alternative steering transaxle 1E. Steering transaxle 1E incorporating hydraulic motors 3L and 3R is provided with externally open hydraulic ports 77A and 77B to be fluidly connected to a common hydraulic pump. A switching valve 71 is provided in steering transaxle 1E so as to constantly fluidly connect port 77A to a bifurcating point 75, and constantly fluidly connect port 77B to a bifurcating point 76. A distribution passage 72 for distributing or collecting fluid into and from hydraulic motors 3L and 3R is interposed between bifurcating point 75 and motors 3L and 3R. On distribution passage 72, an orifice 75a is interposed between motor 3L and bifurcating point 75, and an orifice 75b between motor 3R and bifurcating point 75. A distribution passage 73 for distributing or collecting fluid into and from hydraulic motors 3L and 3R is interposed between bifurcating point 76 and motors 3L and 3R.

A bypass passage 74 is interposed between motors 3L and 3R so as to bypass distribution passage 72. Joint points of bypass passage 74 to distribution passage 72 are disposed between orifice 75a and motor 3L, and between orifice 75b and motor 3R. A pair of check valves 79a and 79b are provided on bypass passage 74. Check valve 79a allows only flow of fluid from bypass passage 74 to motor 3L (or orifice 75a). Check valve 79b allows only flow of fluid from bypass passage 74 to motor 3R (or orifice 75b). A passage 74a is interposed between switching valve 71 and a joint point 79 on bypass passage 74 between check valves 79a and 79b.

Switching valve 71 is shifted between a differential mode position 71A and a differential restriction mode position 71B. Switching valve 71 set at differential mode position 71A fluidly connects port 77A to passage 74a. In other words, switching valve 71 set at differential mode position 71A opens a first hydraulic circuit including distribution passages 72 and 73, passage 74a and bypass passage 74. Switching valve 71 set at differential restriction mode position 71B shuts off passage 74a from both ports 77A and 77B. In other words, switching valve 71A set at differential mode position 71A opens a second hydraulic circuit including distribution passages 72 and 73 but not passages 74a and 74.

When port 77B receives fluid from the hydraulic pump to be supplied to motors 3L and 3R and port 77A discharges the fluid from motors 3L and 3R to the hydraulic pump (e.g., in the case of backward traveling of the vehicle), hydraulic fluid from port 77B flows through switching valve 71, bifurcating point 76 and distribution passage 73 so as to be distributed between hydraulic motors 3L and 3R. Motors 3L and 3R are thereby differentially driven, whether switching valve 71 is set at differential mode position 71A or differential restriction mode position 71B.

When port 77A receives fluid from the hydraulic pump to be supplied to motors 3L and 3R and port 77B discharges the fluid from motors 3L and 3R to hydraulic pump (e.g., in the case of forward traveling of the vehicle), hydraulic fluid from port 77A flows to hydraulic motors 3L and 3R through switching valve 71, bifurcating point 75 and orifices 75a and 75b on distribution passage 72. Orifices 75a and 75b restrict fluid supplied to respective motors 3L and 3R.

In this state, when switching valve 71 is set at differential restriction mode position 71B, switching valve 71 opens the above-mentioned second hydraulic circuit, in which fluid is not supplied through passage 74a and bypass passage 74 to motors 3L and 3R. Therefore, due to the regulation of fluid to motors 3L and 3R by orifices 75a and 75b, the difference of supplied fluid between motors 3L and 3R is restricted so as to restrict differential rotation of motors 3L and 3R.

On the other hand, when switching valve 71 is set at differential mode position 71A, switching valve 71 opens the above-mentioned first hydraulic circuit. In this circuit, fluid from port 77A is also supplied through passage 74a and bypass passage 74 to motors 3L and 3R, bypassing orifices 75a and 75b and thereby being distributed between motors 3L and 3R so as to allow differential rotation of motors 3L and 3R.

As shown in FIG. 11, switching valve 71 is a solenoid valve electrically controlled by a controller 80. A manipulator for differential locking (such as differential locking pedal 102 shown in FIG. 19) is provided on a vehicle, and controller 80 controls switching valve 71 based on detection of the operational condition of the manipulator. Alternatively or additionally, controller 80 may decide whether one of wheels 9L and 9R slips or not based on detection of the difference of rotary speed between left and right wheels 9L and 9R. If either wheel 9L or 9R slips, switching valve 80 is automatically switched from differential mode position 71A to differential restriction mode position 71B. Alternatively, switching valve 71 may be manually controlled in connection with a manipulator provided on a vehicle.

FIG. 12 illustrates a four-wheel driving vehicle equipped with an engine 41, steering transaxle 1E and unsteering transaxle 20D. Steering transaxle 1E drives steerable wheels 9L and 9R, and unsteering transaxle 20D unsteerable wheels 46L and 46R. Either the pair of wheels 9L and 9R or the pair of wheels 46L and 46R serve as front wheels, and the other pair serve as rear wheels.

Unsteering transaxle 20D is the same as unsteering transaxle 20D shown in FIG. 7. Hydraulic pump 25 of HST 20 in unsteering transaxle 20D can be also fluidly connected through switching valve 48 to hydraulic motors 3L and 3R in steering transaxle 1E. In this regard, pipes 28a and 28b are extended from unsteering transaxle 20D to be connected to respective ports 77A and 77B. Switching valve 48 can be shifted between the two-wheel drive mode position and the four-wheel drive mode position, similar to that shown in FIG. 7.

While switching valve 48 is set at the four-wheel drive mode position, and hydraulic pump 25 of HST 20 is set to deliver fluid to motor 26 after supplying motors 3L and 3R with fluid flowing from port 77A to port 77B (e.g., speed changing manipulator 42a is set for forward traveling), fluid through orifices 75a and 75b is distributed to motors 3L and 3R. If switching valve 71 is disposed at differential restriction mode position 71B, all the fluid supplied to motors 3L and 3R is restricted by orifices 75a and 75b, whereby the difference of supplied fluid between motors 3L and 3R is restricted so as to restrict the differential rotation of motors 3L and 3R. If switching valve 71 is disposed at differential mode position 71A, motors 3L and 3R are supplied with fluid from bypass passage 74 that bypasses orifices 75a and 75b in addition to the fluid from orifices 75a and 75b. In this state fluid is distributed to motors 3L and 3R so as to allow the differential rotation of motors 3L and 3R.

Similar to steering transaxle 1D, in steering transaxle 1E shown in FIG. 12, flow control valve 49A and bypass (check) valve 49a are interposed in parallel between port 77A and switching valve 71, and flow control valve 49B and bypass (check) valve 49b are interposed in parallel between port 77B and switching valve 71. Each of bypass valves 49a and 49b passes fluid overflowing corresponding flow control valve 49A or 49B. The opening degrees of flow control valves 49A and 49B are adjusted by actuator 49C electrically controlled by controller 80.

Bypass passages 29a and 29b with respective orifices and check valves are interposed between the passage between port 77A and switching valve 71 and the passage between port 77B and switching valve 71. When the passage between port 77A and switching valve 71 is hydraulically pressured excessively higher than the passage between port 77B and switching valve 71, the check valve of bypass passage 29a is opened through the orifice of bypass passage 29a to pass fluid from the higher-pressured passage between port 77A and switching valve 71 to the lower-pressured passage between port 77B and switching valve 71. When the passage between port 77B and switching valve 71 is hydraulically pressured excessively higher than the passage between port 77A and switching valve 71, the check valve of bypass passage 29b is opened to pass fluid through the orifice of bypass passage 29b from the higher-pressured passage between port 77B and switching valve 71 to the lower-pressured passage between port 77A and switching valve 71.

Controller 80 is provided with detection means including a sensor 80a for detecting the operational condition of a manipulator for differential locking (such as differential locking pedal 102 shown in FIG. 19), a sensor 80b for detecting the operational condition of a lifter (such as lift lever 103 shown in FIG. 19) for a working machine (if the vehicle is a tractor equipped with a working machine), a sensor 80c for detecting the steering condition of the vehicle (such as the turning angle of wheels 9L and 9R or of steering wheel 104 as shown in FIG. 19), rotary speed sensors 80d and 80e for detecting rotary speeds of respective steerable wheels 9L and 9R, brake sensors 80f and 80g for detecting depression of brake operation devices (such as brake pedals 105 and 106 shown in FIG. 19) for respective brakes 47L and 47R, and a sensor 80h for detecting the operational condition of speed control manipulator 42a.

Controller 80 switches switching valve 71 based on a detection signal from sensor 80a. Controller 80 may switch switching valve 71 based on a detection signal from sensors 80d and 80e so as to set switching valve 71 at differential restriction mode position 71B when either wheel 9L or 9R slips. Further, controller 80 controls actuator 49C based on a detection signal from any of sensors 80a, 80b, 80c, 80d, 80e, 80f, 80g and 80h.

Movable swash plates 33L and 33R are operated in association with the left or right turning angle of steerable wheels 9L and 9R (or steering wheel 104 as show in FIG. 19) so that wheels 9L and 9R rotate faster than wheels 46L and 46R during turning of the vehicle, thereby preventing dragging of wheels 9L and 9R or wheels 46L and 46R. For example, the rotary speed of wheels 9L and 9R is 1⅕-1½ times as large as that of wheels 46L and 46R during turning of the vehicle.

Figure 13:
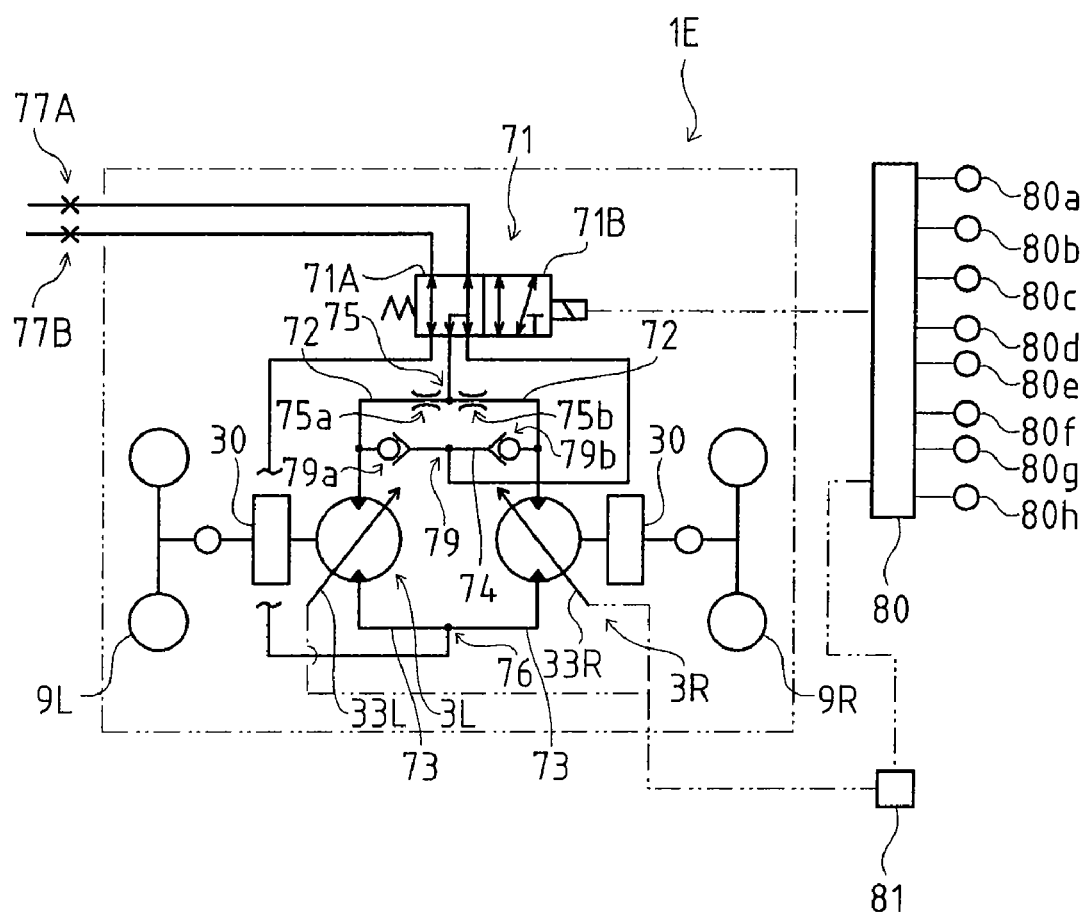
FIG. 13 is a structural and hydraulic circuit diagram of steering transaxle 1E when movable swash plates 33L and 33R of hydraulic motors 3L and 3R are controlled by electrically controlled actuator 81.

In FIGS. 11 and 12, movable swash plates 33L and 33R are interlockingly connected through a mechanical linkage 9a to the steering mechanism of one of steerable wheels 9L and 9R (such as steerable casing 30b of one of right and left wheel support units 30). Alternatively, as shown in FIG. 13, steering transaxle 1E may be provided with actuator 81 for controlling movable swash plates 33L and 33R. Controller 80 electrically controls actuator 81 based on a detection signal from sensor 80c for detecting the turning angle of steerable wheels 9L and 9R (or of steering wheel 104 as shown in FIG. 19).

Similar to the vehicle equipped with steering transaxle 1D as shown in FIG. 7, during the brake turn of the vehicle, i.e., when one of brakes 47L and 47R is operated for braking during full-turning of the vehicle, the opening degrees of flow control valves 49A and 49B must be increased, or the tilt angle of swash plates 33L and 33R must be further reduced (in the case of FIG. 13), so as to further accelerate steerable wheels 9L and 9R. However, if switching valve 71 is disposed at the differential restriction mode position 71B, the further acceleration of steerable wheels 9L and 9R for the brake turn must be restricted. In this regard, controller 80 controls actuator 49C or 81 for the brake turn based on detection signals from sensors 80a, 80b, 80c, 80d, 80e, 80f, 80g and 80h.

Figure 14:
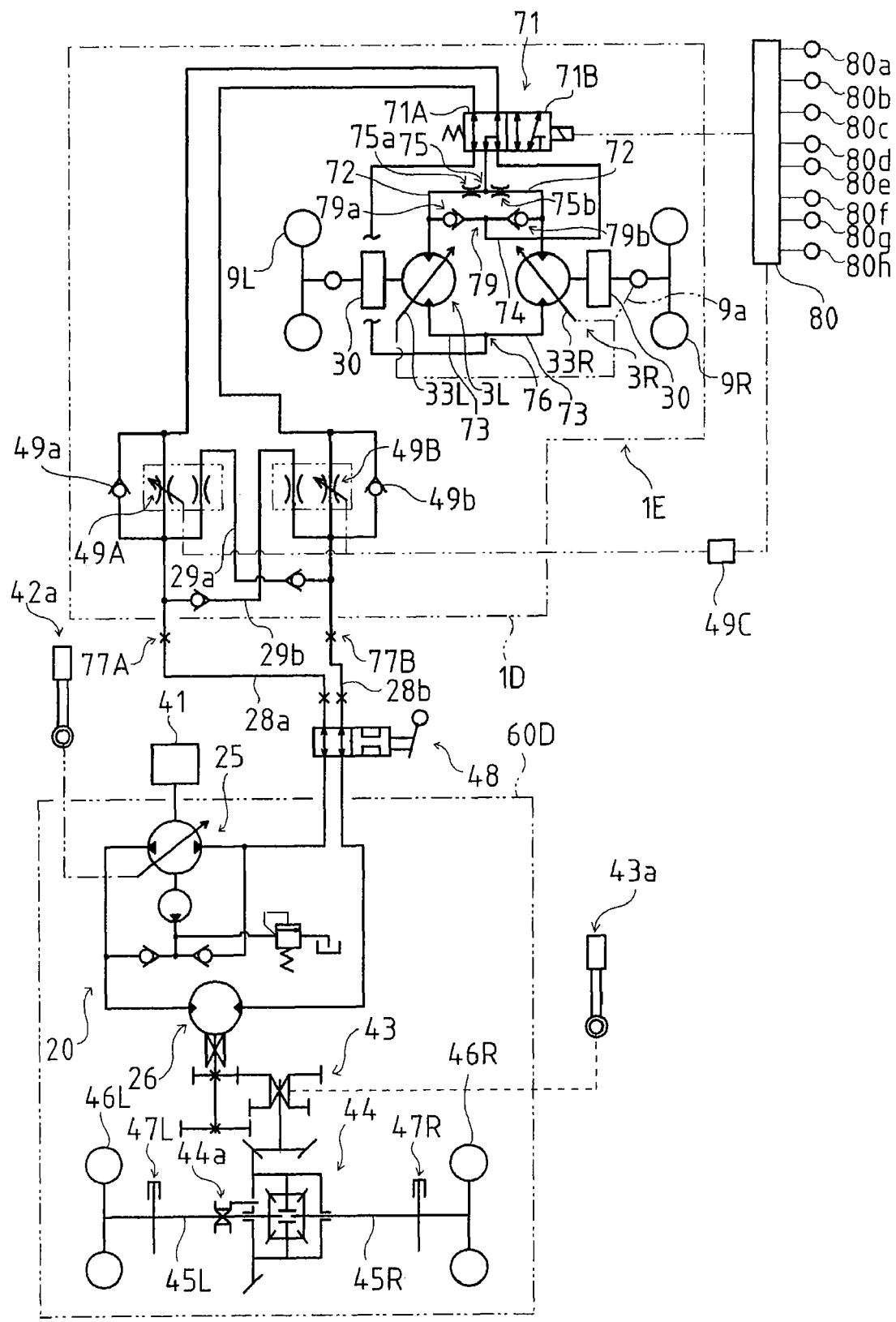
FIG. 14 is a structural and hydraulic circuit diagram of a four-wheel driving vehicle equipped with steering transaxle 1E and unsteering transaxle 60D.

FIG. 14 illustrates a vehicle equipped with engine 41, steering transaxle 1E for driving steerable wheels 9L and 9R, and unsteering transaxle 60D for driving unsteerable wheels 46L and 46R. While HST 20 serves as a main speed changing unit, unsteering transaxle 60D incorporates mechanical auxiliary speed changing gear unit 43 interposed between hydraulic motor 26 and differential gear unit 44. Manipulator 43a for operating auxiliary speed changing gear unit 43 is disposed on the vehicle. In comparison of FIG. 14 with FIGS. 7 and 12, description will be omitted of those parts and structures designated by the same reference numerals, whose functions are identical.

Figure 15:
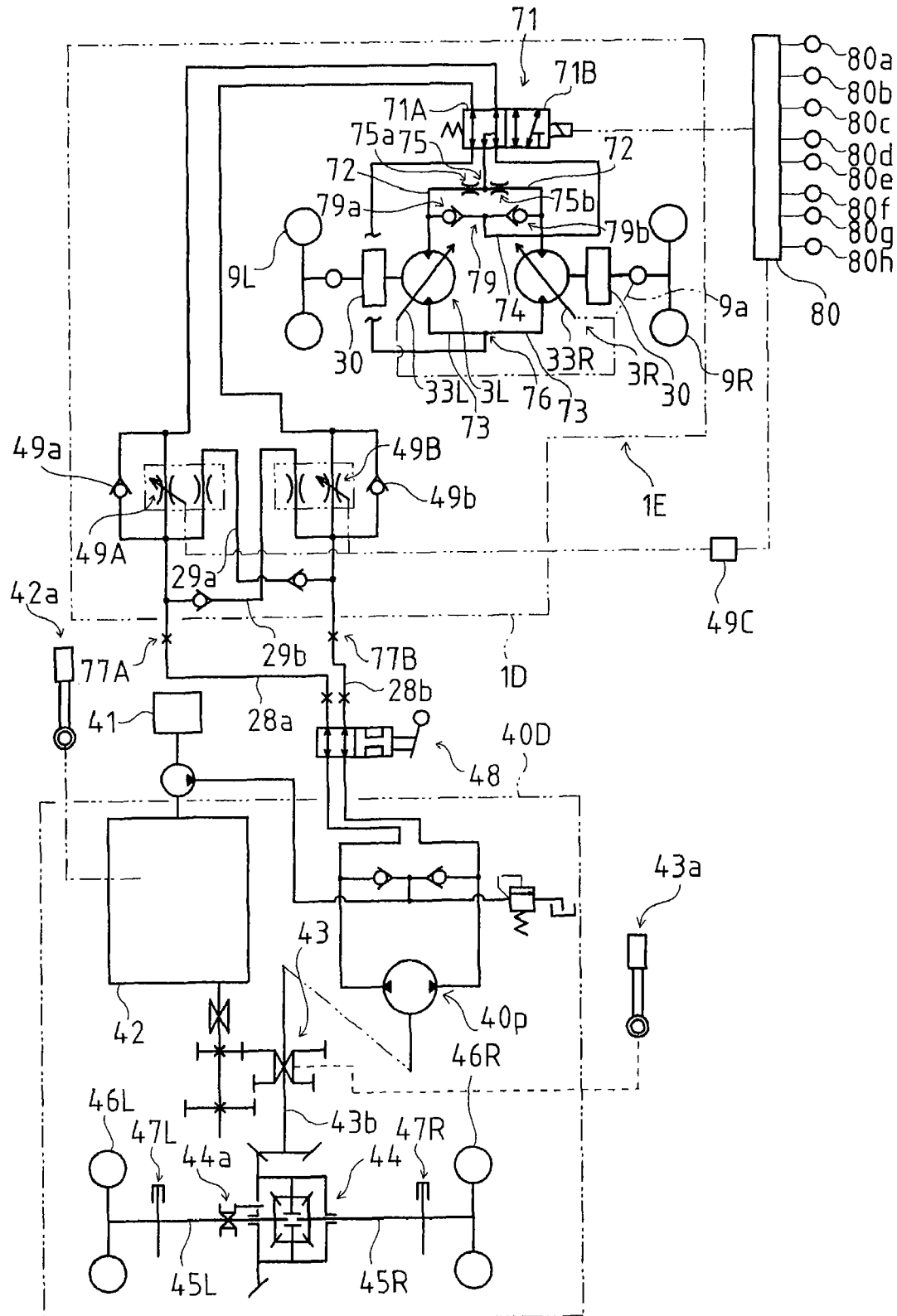
FIG. 15 is a structural and hydraulic circuit diagram of a four-wheel driving vehicle equipped with steering transaxle 1E and unsteering transaxle 40D.

FIG. 15 illustrates a vehicle equipped with engine 41, steering transaxle 1E for driving steerable wheels 9L and 9R, and unsteering transaxle 40D for driving unsteerable wheels 46L and 46R. In comparison between FIG. 15 with FIGS. 7, 9, 12 and 14, description thereof will be omitted of those parts and structures designated by the same reference numerals, whose functions are identical.

Unsteering transaxle 40D incorporates main speed changing unit 42, such as a hydraulic clutch system or an HMT, which is driven by engine 41 and operatively connected to main speed changing manipulator 42a. Unsteering transaxle 40D incorporates mechanical auxiliary speed changing gear unit 43 interposed between main speed changing unit 42 and differential gear unit 44. Auxiliary speed changing gear unit 43 includes a final pinion shaft 43b on which a final pinion is fixed to mesh with a bull gear of differential gear unit 44.

Unsteering transaxle 40D incorporates hydraulic pump 40p for supplying fluid through pipes 28a and 28b and switching valve 48 to hydraulic motors 3L and 3R in steering transaxle 1E. Final pinion shaft 43b of auxiliary speed changing gear unit 43 also serves as a pump shaft of hydraulic pump 40p.

Pipes 28a and 28b connected to respective ports of hydraulic pump 40p are extended outward from unsteering transaxle 40D and connected to respective ports 77A and 77B of steering transaxle 1E, and switching valve 48 is provided across pipes 28a and 29b. When switching valve 48 is set at the four-wheel drive mode position, hydraulic motors 3L and 3R are fluidly connected to hydraulic pump 40p. In this state, unsteerable wheels 46L and 46R are driven by tandem speed changing units 42 and 43 in unsteering transaxle 40D, and steerable wheels 9L and 9R are driven by motors 3L and 3R in steering transaxle 1D which are supplied with fluid from hydraulic pump 40p in unsteering transaxle 40D. When switching valve 48 is set at the two-wheel drive mode position, hydraulic motors 3L and 3R are fluidly isolated from hydraulic pump 40p. In this state, only unsteerable wheels 46L and 46R are driven by tandem speed changing units 42 and 43.

Figure 16:
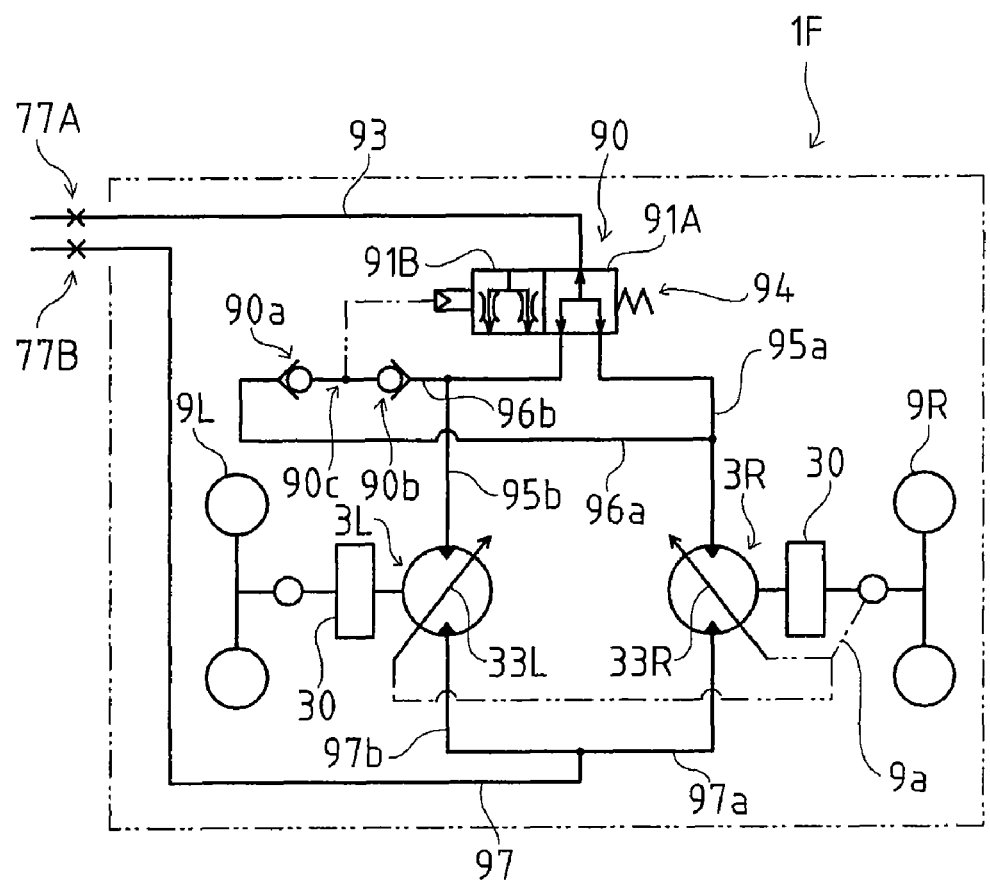
FIG. 16 is a structural and hydraulic circuit diagram of a steering transaxle 1F incorporating hydraulic motors 3L and 3R provided with a hydraulic differential restriction system including a hydraulic pressure pilot type switching valve 90.

FIG. 16 illustrates alternative steering transaxle 1F. Steering transaxle 1F incorporating hydraulic motors 3L and 3R is provided with externally open hydraulic ports 77A and 77B to be fluidly connected to a common hydraulic pump. In steering transaxle 1F, a passage 97 from port 77B bifurcates into passages 97a and 97b connected in parallel to hydraulic motors 3R and 3L. In steering transaxle 1F, a switching valve 90 is interposed between port 77A and the pair of motors 3L and 3R. Switching valve 90 is a hydraulic pressure-pilot valve, which is shifted between a differential mode position 91A and a differential restriction mode position 91B. Switching valve 90 is provided with a spring 94 so as to be biased toward differential mode position 91A.

In steering transaxle 1F, switching valve 90 bifurcates a passage 93 from port 77A into passages 95a and 95b connected in parallel to respective motors 3R and 3L opposite to passages 97a and 97b. In other words, switching valve 90 constantly serves as a bifurcating point of passage 93 into passages 95a and 95b whether it is set at differential mode position 91A or differential restriction mode position 91B. However, switching valve 90 set at differential restriction mode position 91B connects passage 93 to passages 95a and 95b through respective orifices, and switching valve 90 set at differential mode position 91A properly connects passage 93 to passages 95a and 95b without orifices.

The pilot pressure fluid for setting switching valve 90 to differential restriction mode position 91B is supplied from a shuttle valve interposed between passages 95a and 95b. In this regard, the pilot pressure fluid is supplied from a passage 90c between check valves 90a and 90b. A passage 96a is interposed between check valve 90a and passage 95a, and a passage 96b is interposed between check valve 90b and passage 95b. Check valves 90a and 90b allow only flow of fluid from respective passages 96a and 96b to passage 90c. Thus, if one of passages 95a and 95b is excessively pressured, the pilot pressure is established to switch switching valve 90 from differential mode position 91A to differential restriction mode position 91B.

When port 77B receives fluid from the hydraulic pump to be supplied to motors 3L and 3R and port 77A discharges the fluid from motors 3L and 3R to the hydraulic pump (e.g., in the case of backward traveling of the vehicle), hydraulic fluid from port 77B is distributed into hydraulic motors 3L and 3R through passages 97, 97a and 97b, thereby differentially driving motors 3L and 3R, whether switching valve 90 is set at differential mode position 91A or differential restriction mode position 91B.

When port 77A receives fluid from the hydraulic pump to be supplied to motors 3L and 3R and port 77B discharges the fluid from motors 3L and 3R to hydraulic pump (e.g., in the case of forward traveling of the vehicle), hydraulic fluid from port 77A flows to hydraulic motors 3L and 3R through passage 93, switching valve 90 and passages 95a and 95b. Switching valve 90 is normally set at differential mode position 91A by the biasing force of spring 94 so as to allow the differential rotation of motors 3L and 3R. If one of wheels 9L and 9R slips and one of passages 95a and 95b is excessively hydraulically pressured, switching valve 90 is switched to differential restriction mode position 91B so as to restrict differential rotation of motors 3L and 3R.

In this way, instead of electric control means, hydraulic pressure pilot type switching valve 90 is automatically switched to differential restriction mode position 91B depending upon detection of the difference of hydraulic pressure between motors 3L and 3R.

Figure 17:
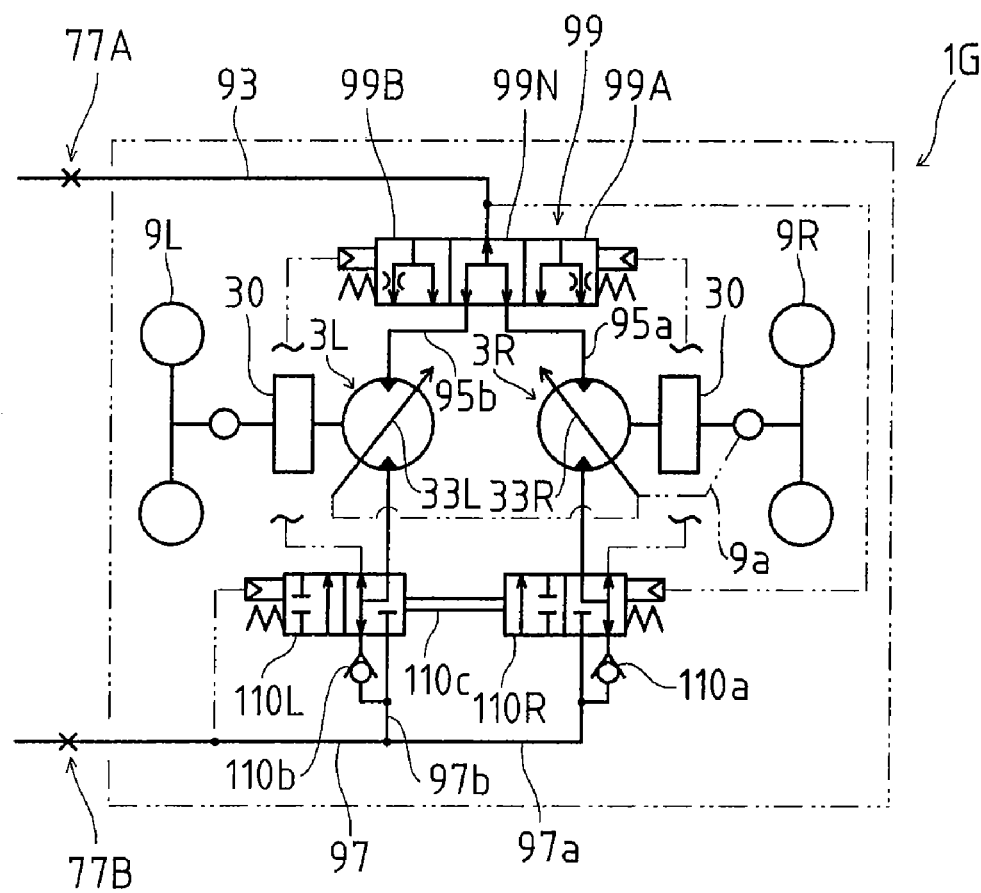
FIG. 17 is a structural and hydraulic circuit diagram of a steering transaxle 1G incorporating hydraulic motors 3L and 3R provided with a hydraulic differential restriction system including hydraulic pressure pilot type switching valves 99, 110L and 110R.

FIG. 17 illustrates alternative steering transaxle 1G, which can restrict flow of fluid to only one of motors 3L and 3R. Steering transaxle 1G incorporating hydraulic motors 3L and 3R is provided with externally open hydraulic ports 77A and 77B to be fluidly connected to a common hydraulic pump. It is assumed that the flow of fluid from port 77A to port 77B through steering transaxle 1G is provided for the forward traveling rotation of motors 3L and 3R (wheels 9L and 9R), and the opposite flow of fluid from port 77B to port 77A for the backward traveling rotation.

In steering transaxle 1G, passage 97 from port 77B bifurcates into passages 97a and 97b connected in parallel to hydraulic motors 3R and 3L. Each of passages 97a and 97b passes through each of hydraulic pressure pilot type switching valves 110R and 110L. Switching valves 110L and 110R are connected to each other through a connection member 110c so as to be integrally shifted between a forward traveling position and a backward traveling position.

A check valve 110a is interposed between switching valve 110R and passage 97a, and check valve 110b between switching valve 110L and passage 97b. Each of check valves 110a and 110b allows only flow of fluid from each of switching valve 110R and 110L to port 77B through passage 97.

When the vehicle travels forward, fluid flows through steering transaxle 1G from port 77A to port 77B so that the hydraulic pressure in passage 93 interposed between port 77A and a later-discussed switching valve 99 becomes higher than that in passage 97. The high pressure in passage 97 serve as the pilot pressure for setting switching valves 110R and 110L to the forward traveling position, where passages 97a and 97b are cut off and check valves 110a and 110b are connected to respective motors 3R and 3L. Therefore, the fluid from motors 3R and 3L must flow through respective check valves 110a and 110b to port 77B.

When the vehicle travels backward, fluid flows through steering transaxle 1G from port 77B to port 77A so that the hydraulic pressure in passage 97 becomes higher than that in passage 93. The high pressure in passage 93 serve as the pilot pressure for setting switching valves 110R and 110L to the backward traveling position, where passages 95a and 95b are opened and check valves 110a and 110b are cut off. Therefore, the fluid from port 77B is properly distributed into motors 3R and 3L so as to allow differential rotation of motors 3R and 3L.

In steering transaxle 1G, a hydraulic pressure pilot type three-position switching valve 99 bifurcates passage 93 from port 77A into passages 95a and 95b connected in parallel to respective motors 3R and 3L opposite to passages 97a and 97b. In other words, switching valve 99 constantly serves as a bifurcating point of passage 93 into passages 95a and 95b at whichever position it is set among three positions 99A, 99B and 99N.

Switching valve 99 set at right restriction position 99A connects passage 93 to passage 95a through an orifice, and to passage 95b through no orifice, thereby restricting only flow to right motor 3R. Switching valve 99 set at left restriction position 99B connects passage 93 to passage 95a through no orifice, and to passage 95b through an orifice, thereby restricting only flow to left motor 3L. Switching valve 99 set at differential mode position 99N properly connects passage 93 to passages 95a and 95b without the orifices.

Switching valve 99 has opposite springs and opposite pilot operation portions. The springs bias switching valve 99 toward differential mode position 99N. Switching valves 110R and 110L set at the forward traveling position supply hydraulic pilot pressure fluid overflowing respective check valves 110a and 110b to the opposite pilot operation portions of switching valve 99. During the forward traveling of the vehicle, unless the difference of hydraulic pilot pressure between the opposite operation portions of switching valve 99 exceeds the force of the springs biasing switching valve 99 to differential mode position 99N, switching valve 99 remains at differential mode position 99N and properly distributes fluid from port 77A into motors 3R and 3L. As mentioned above, switching valves 110R and 110L pass fluid from motors 3R and 3L to port 77B through check valves 110a and 110b. Therefore, hydraulic motors 3R and 3L can be differentially rotated.

During the forward traveling of the vehicle, for example, if right wheel 9R is ditched and becomes free from the friction against the ground surface, the fluid from port 77A flowing through right motor 3R driving the ditched wheel 9R increases and the fluid flowing through the other left motor 3L reduces. In this state, the hydraulic pilot pressure fluid from switching valve 110R to switching valve 99 exceeds that from switching valve 110L to switching valve 99, and, if the difference of hydraulic pilot pressure between the opposite pilot operation portions of switching valve 99 exceeds the force of the springs biasing switching valve 99 toward differential mode position 99N, the hydraulic pilot pressure from switching valve 110R pushes switching valve 99 to right restriction position 99A. Therefore, switching valve 99 restricts the fluid flowing to right motor 3R, and prevents the reduction of fluid flowing to left motor 3L. Thus, left motor 3L is supplied with sufficient fluid so as to drive unditched left wheel 9L so that the vehicle can escape from the ditch. If left wheel 9L is ditched during forward traveling of the vehicle, the hydraulic pilot pressure from switching valve 110L exceeds that from switching valve 110R, thereby shifting switching valve 99 to left restriction position 99B.

When the vehicle travels backward, switching valves 110L and 110R are set at the backward traveling position as mentioned above. Switching valves 110L and 110R cut off the respective pilot pressure fluid passages to switching valve 99 so as to constantly set switching valve 99 at differential mode position 99N. Switching valve 99 set at differential mode position 99N collects fluid from motors 3L and 3R and sends the collected fluid to port 77A. Therefore, fluid flowing through steering transaxle 1G from port 77B to port 77A is properly distributed into motors 3R and 3L so as to allow the differential rotation of motors 3R and 3L.

Figure 18:
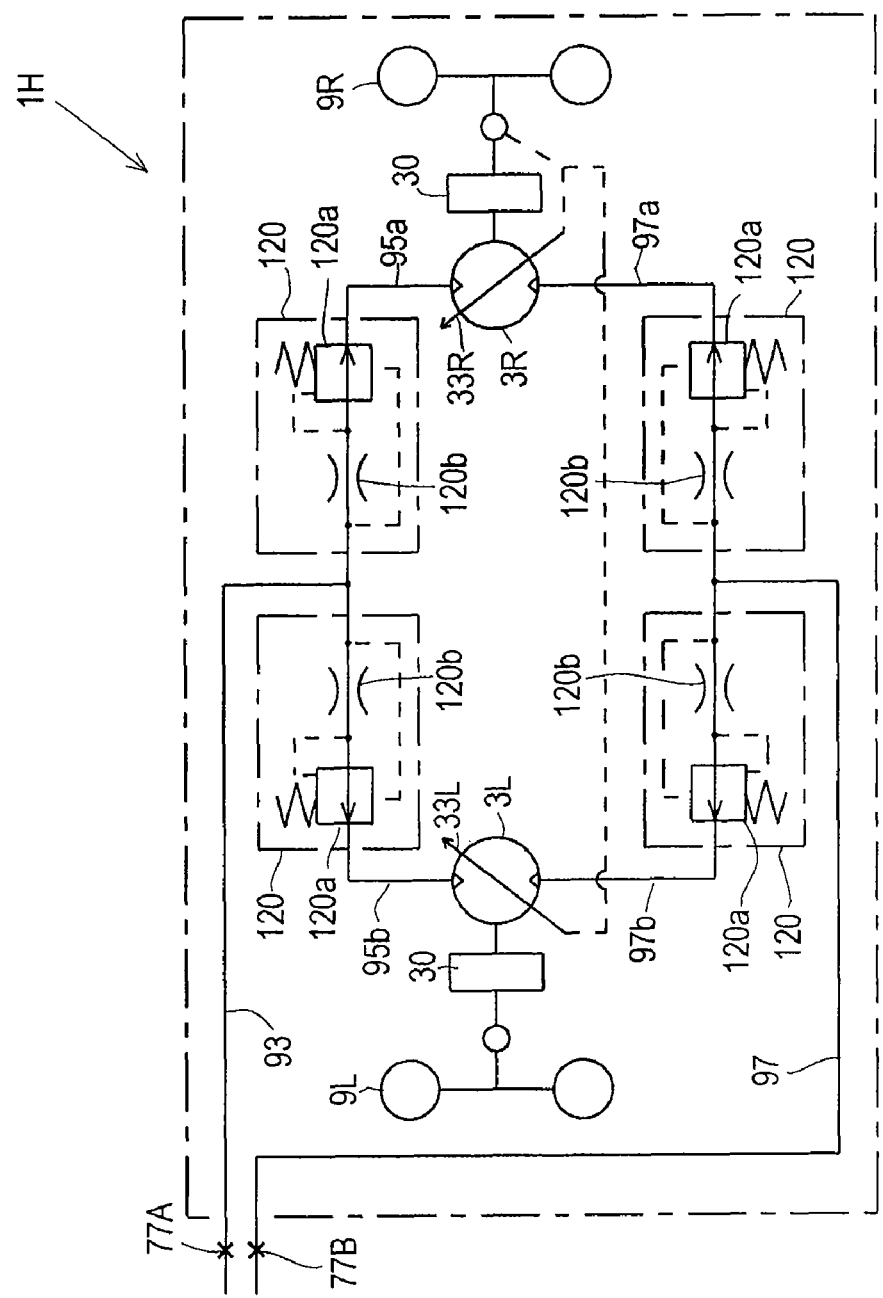
FIG. 18 is a structural and hydraulic circuit diagram of a steering transaxle 1H incorporating hydraulic motors 3L and 3R provided with a hydraulic differential restriction system including flow control valves 120.

FIG. 18 illustrates alternative steering transaxle 1H including flow control valves 120 for restricting the differential rotation of motors 3L and 3R whether the vehicle travels forward or backward. Steering transaxle 1H incorporating hydraulic motors 3L and 3R is provided with externally open hydraulic ports 77A and 77B to be fluidly connected to a common hydraulic pump.

In steering transaxle 1H, passage 93 from port 77A bifurcates into passages 95a and 95b connected in parallel to hydraulic motors 3R and 3L. Passages 95a and 95b pass through respective flow control valves 120. Also, in steering transaxle 1H, passage 97 from port 77B bifurcates into passages 97a and 97b connected in parallel to hydraulic motors 3R and 3L. Passages 97a and 97b pass through respective flow control valves 120.

Each of flow control valve assemblies 120 includes an open-and-close valve 120a and an orifice 120b connected to each other in tandem. Valve 120a is a hydraulic pilot pressure valve having a biasing spring for opening valve 120a. A first hydraulic pilot pressure to be applied onto valve 120a against the spring is extracted from a portion of each of passages 95a, 95b, 97a and 97b opposite to valve 120a with respect to orifice 120b. Another second pilot pressure fluid to be applied onto valve 120a in the same direction of the spring is extracted from a portion of each of passages 95a, 95b, 97a and 97b between orifice 120b and valve 120a. Thus, the resultant pilot pressure as the difference between the first and second pilot pressures is applied onto valve 120a in one of the opposite directions, decided depending upon which of the first and second pilot pressures is higher than the other.

When flow control valve assembly 120 is disposed on the downstream side of corresponding motor 3L or 3R with respect to the flow of fluid between ports 77A and 77B through motors 3L and 3R, its valve 120a receives the second pilot pressure exceeding the first pilot pressure, i.e., the resultant pilot pressure is in the same direction of the spring. In brief, each flow control valve assembly 120 necessarily passes fluid therethrough when it is disposed on the downstream side of corresponding motor 3L or 3R with respect to the flow of fluid between ports 77A ad 77B.

On the other hand, when flow control valve assembly 120 is disposed on the upstream side of corresponding motor 3L or 3R with respect to the flow of fluid between ports 77A and 77B through motors 3L and 3R, its valve 120a receives the first pilot pressure exceeding the second pilot pressure, i.e., the resultant pilot pressure is opposite to the spring. As the resultant pilot pressure against the spring is increased, the open degree of valve 120a is reduced, and finally, valve 120a is closed.

The opening degree of each orifice 120b is set such as to allow the proper distributed fluid flow. When the distribution rate of fluid between motors 3L and 3R is normal, i.e., fluid is substantially equally distributed between motors 3L and 3R, each of valves 120a is opened by the balanced difference of hydraulic pressure between the first and second pilot pressures and the force of the spring.

For example, if wheel 9R is ditched while fluid flows through steering transaxle 1H from port 77A to 77B, excessively increased fluid will flow to motor 3R through passage 95a. Therefore, in flow control valve assembly 120 on passage 95a, fluid overflowing orifice 120b increases in the portion of passage 95a on the upstream of orifice 120b. Thus, the first pilot pressure to valve 120a increases so as to reduce the open degree of valve 120a or close valve 120a in flow control valve assembly 120 on passage 95a, thereby shutting off motor 3R from supply of fluid. Given the reduction of fluid flow to motor 3R through passage 95a, fluid supplied through passage 95b to motor 3L for driving unditched wheel 9L is increased, and the vehicle can escape from the ditch by the driving of left wheel 9L.

In this way, steering transaxle 1E is provided with the differential restriction system for motors 3L and 3R therein instead of an electric control system.

FIG. 19 illustrates an electric control system including a controller 100 and an actuator 101 electrically controlled by controller 100. Actuator 101 represents the actuator for operating arm 15d in steering transaxle 1A (shown in FIG. 1), the control valve for controlling supply of fluid to hydraulic port 7p in steering transaxle 1B (shown in FIG. 4), switching valve 70 in steering transaxle 1D (as shown in FIG. 6), and switching valve 71 in steering transaxle 1E (as shown in FIG. 11). Controller 100 represents controllers 50 and 80 for respective controlling switching valves 70 and 71.

Controller 100 is provided with detection means including a sensor 100a for detecting the operational condition of differential locking (or restriction) pedal 102, a sensor 100b for detecting the operational condition of lift lever 103 for lifting a working machine (if the vehicle is a tractor equipped with a working machine), a sensor 100c for detecting the steering angle of steering wheel 104, rotary speed sensors 100d and 100e for detecting rotary speeds of respective steerable wheels 9R and 9L, brake sensors 100f and 100g for detecting depression of brake pedals 105 and 106 for respective brakes 47L and 47R, and a sensor 100h for detecting the operational condition of main speed control manipulator (lever) 42a. Sensors 100a to 100h represent sensors 50a to 50h for controller 50 of steering transaxle 1D and sensors 80a to 80h for controller 80 of steering transaxle 1E, respectively. Additionally, controller 100 is provided with a sensor 100j for detecting the operational condition of auxiliary speed control manipulator (lever) 43a, and sensors 100p and 100q for detecting conditions of respective motors 3R and 3L.

For example, actuator 101 is actuated, i.e., switched on, for differential locking (restriction) by controller 100 when any of conditional patterns A to E represented in a table of FIG. 20 is detected. According to conditional pattern A, when any of sensors 100f and 100g detects depression of corresponding brake pedal 105 or 106, actuator 101 is switched on regardless of the detection by sensors 100a, 100b, 100c, 100d, 100e.

According to conditional patterns B to E, actuator 101 is switched on while sensors 100b, 100d, 100e, 100f and 100g detect that lift lever 103 is operated for raising the working machine (meaning that the vehicle travels on road without working), the rotary speed difference between wheels 9L and 9R is excessively large (meaning that one of wheels 9R and 9L slips), and none of brake pedals 105 and 106 are depressed, whether or not sensor 100a detects depression of differential locking (restriction) pedal 102, and regardless of whether sensor 100c detects the turning angle of steering wheel 104 to be large or small.

Controller 100 may control actuator 101 based on detection by sensors 100p and 100q. For example, sensors 100p and 100q for detecting conditions of motors 3R and 3L detect the rotary speeds of motor shafts 4R and 4L, torques applied onto motor shafts 4R and 4L, or/and hydraulic pressure in suction ports of motors 3R and 3L, respectively.

For example, if sensors 100p and 100q are the pressure or torque sensors, the output torques of motors 3R and 3L are calculated by the detection of sensors 100p and 100q, and compared with a predetermined value. If one of the output torques is below the predetermined value, the corresponding one of wheels 9R and 9L is decided to slip, thereby switching on actuator 101. If both the output torques of motors 3R and 3L exceed the predetermined value, actuator 101 is switched off so as to allow the differential rotation of motors 3R and 3L. Preferably, the predetermined value of output torque of each of motors 3R and 3L can be adjusted corresponding to the weight of the vehicle, the processes of work, or so on.

Of course, differential locking (restriction) pedal 102 is optionally depressed for switching on of actuator 101 for differential locking (restriction) in correspondence to various situations, such as for towing of the vehicle, as well as by the automatic control of actuator 101.

Although the invention has been described in its preferred form with a certain degree of particularity, it is understood that the present disclosure of the preferred form can be changed in the details of construction, and the combination and arrangement of parts may be adjusted, without departing from the spirit and the scope of the invention as hereinafter claimed.

What is claimed is:

1. A hydraulic transaxle, comprising:
a pair of left and right axles;
a transaxle casing steerably supporting the left and right axles at left and right respective outside ends of the transaxle casing;
a pair of left and right hydraulic motors supported by the transaxle casing so as to drive the respective left and right axles;
hydraulic ports provided in the transaxle casing so as to fluidly connect the left and right hydraulic motors in parallel to a common hydraulic pump; and
a system for restricting or canceling differential rotation of the left and right hydraulic motors, wherein the system includes means for mechanically applying a predetermined frictional force onto a pair of motor shafts of the left and right hydraulic motors.

2. The hydraulic transaxle according to claim 1, wherein the transaxle casing includes a hollow portion between the left and right outside ends thereof, wherein the left and right hydraulic motors are disposed in the hollow portion of the transaxle casing so that the motor shafts of the respective left and right hydraulic motors are aligned coaxially to each other in the hollow portion so as to have respective rotary axes parallel to rotary axes of the left and right axles, and wherein the system is disposed in the hollow portion between proximal ends of the motor shafts, wherein the proximal ends of the motor shafts face each other.

3. The hydraulic transaxle according to claim 2, further comprising:
a pair of left and right upright plate-shaped port blocks disposed in the hollow portion of the transaxle casing, wherein the left and right port blocks have respective proximal surfaces facing each other with a space therebetween, and have respective distal surfaces opposite to each other, wherein the left and right hydraulic motors are attached onto the respective distal surfaces of the left and right port blocks, and wherein the motor shafts of the respective left and right hydraulic motors are extended proximally from the respective proximal surfaces of the left and right port blocks so as to be provided with the system between the proximal ends of the motor shafts.

4. A four-wheel drive vehicle comprising:
a first transaxle including:
- a pair of left and right axles,
- a transaxle casing steerably supporting the left and right axles at left and right respective outside ends of the transaxle casing,
- a pair of first hydraulic motors supported by the transaxle casing so as to drive the respective left and right axles,
- hydraulic ports provided in the transaxle casing so as to supply fluid to the first hydraulic motors, and
- a system for restricting or canceling differential rotation of the first hydraulic motors, wherein the system includes means for mechanically applying a predetermined frictional force onto a pair of motor shafts of the first hydraulic motors;

a second transaxle incorporating a second hydraulic motor for driving left and right other axles; and a common hydraulic pump for supplying fluid to all of the hydraulic motors of the first and second transaxles, wherein the hydraulic ports of the first transaxle fluidly connect the first hydraulic motors in parallel to the common hydraulic pump.

* * * * *